United States Patent [19]
Perriello

[11] Patent Number: 6,051,130
[45] Date of Patent: Apr. 18, 2000

[54] BIOREACTOR FOR REMEDIATION OF POLLUTANTS WITH BUTANE UTILIZING BACTERIA

[76] Inventor: Felix Anthony Perriello, 9 Baker Pl., Apt. 2, West Roxbury, Mass. 02132

[21] Appl. No.: 09/215,965

[22] Filed: Dec. 18, 1998

Related U.S. Application Data

[62] Division of application No. 08/767,750, Dec. 17, 1996, Pat. No. 5,888,396.

[51] Int. Cl.$^7$ ...................................................... C02F 3/34
[52] U.S. Cl. .......................... 210/150; 210/209; 210/220; 210/241; 210/611; 210/908
[58] Field of Search ...................................... 210/610, 611, 210/620, 908, 909, 150, 151, 170, 209, 220, 241

[56] References Cited

U.S. PATENT DOCUMENTS

| | | | |
|---|---|---|---|
| 4,713,343 | 12/1987 | Wilson, Jr. et al. | 435/264 |
| 5,037,551 | 8/1991 | Barkley et al. | 210/603 |
| 5,057,221 | 10/1991 | Bryant et al. | 210/610 |
| 5,316,940 | 5/1994 | Georgiou et al. | 435/252.1 |
| 5,326,703 | 7/1994 | Hazen et al. | 435/262.5 |
| 5,342,769 | 8/1994 | Hunter et al. | 435/166 |
| 5,384,048 | 1/1995 | Hazen et al. | 210/605 |
| 5,441,887 | 8/1995 | Hanson et al. | 435/262.5 |
| 5,814,514 | 9/1998 | Steffan et al. . | |

OTHER PUBLICATIONS

Wilson et al., Biotransformation of Trichloroethylene in Soil, *Applied and Environmental Microbiology*, vol. 49, No. 1, pp. 242–243 (Jan. 1985).

Fogel et al., Biodegradation of Chlorinated Ethenes by a Methane–Utilizing Mixed Culture, *Applied and Enviromental Microbiology*, vol. 51, No. 4, pp. 720–724 (Apr. 1986).

Nelson et al., Aerobic Metabolism of Trichloroethylene by a Bacterial Isolate, *Applied and Enviromental Microbiology*, vol. 52, pp. 383–384 (Aug. 1986).

Little et al., Trichloroethylene Biodegradation by a Methane–Oxidizing Bacterium, *Applied and Environmental Microbiology*, vol. 54, pp. 951–956 (Apr. 1988).

Oldenhuis et al., Degradation of Chlorinated Aliphatic Hydrocarbons by *Methylosinu trichosporium* OB3b Expressing Soluble Methane Monooxygenase, *Applied and Environmental Microbiology*, vol. 55, No. 11, pp. 2819–2826 (Nov. 1989).

Wackett et al., Survey of Microbial Oxygenase: Trichloroethylene Degradation by Propane–Oxidizing Bacteria, *Applied and Environmental Microbiology*, vol. 55, No. 11, pp. 2960–2964 (Nov. 1989).

Tsien et al., Biodegradation of Trichloroethylene by *Methylosinus trichosporium* OB3b, *Applied and Environmental Microbiology*, vol. 55, No. 12, pp. 3155–3161 (Dec. 1989).

(List continued on next page.)

*Primary Examiner*—Christopher Upton
*Attorney, Agent, or Firm*—Alan G. Towner; Eckert Seamans Cherin & Mellott, LLC

[57] ABSTRACT

Butane-utilizing bacteria are used to degrade hydrocarbon pollutants such as trichloroethene (TCE). In-situ or ex-situ techniques may be used to reduce or eliminate hydrocarbon pollutants from liquid, gas and solid sources. In a preferred embodiment, TCE concentrations in various aqueous environments are reduced by contacting a contaminated water source with butane-utilizing bacteria in the presence of oxygen to degrade the TCE by cometabolism or direct metabolism. Suitable butane-utilizing bacteria include Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga. The butane-utilizing bacteria have relatively low TCE toxicity in comparison with conventional methane-utilizing bacteria, and demonstrate an improved ability to degrade TCE.

18 Claims, 22 Drawing Sheets

OTHER PUBLICATIONS

Oldenhuis et al., Kinetics of Chlorinated Hydrocarbon Degradation by *Methylosinus trichosporium* OB3b and Toxicity of Trichloroethylene, *Applied and Environmental Microbiology*, vol. 57, No. 1, pp. 7–14 (Jan. 1991).

Henry et al., Influence of Endogenous and Exogenous Electron Donors and Trichloroethylene Oxidation Toxicity on Trichloroethylene Oxidation by Methanotrophic Cultures from a Groundwater Aquifer, *Applied and Environmental Microbiology*, vol. 57, No. 1, pp. 236–244 (Jan. 1991).

Broholm et al., "Toxicity of 1,1,1–Trichloroethane and Trichloroethene on a Mixed Culture of Methane–Oxidizing Bacteria", *Applied and Environmental Microbiology*, vol. 56, No. 8, pp. 2488–2493 (Aug. 1990).

BIOREACTOR FOR REMEDIATION OF POLLUTANTS WITH BUTANE UTILIZING BACTERIA

This is a division of U.S. application Ser. No. 08/767,750 filed Dec. 17, 1996, now U.S. Pat. No. 5,888,396.

FIELD OF THE INVENTION

The present invention relates to the degradation of pollutants, and more particularly relates to bioremediation of pollutants such as chlorinated aliphatic hydrocarbons using butane-utilizing microorganisms.

BACKGROUND INFORMATION

Chlorinated, volatile, aliphatic hydrocarbons such as trichloroethene (TCE) are the most commonly reported contaminants of groundwater. Through releases of solvents, degreasers and other compounds, chlorinated compound contamination in surface and subsurface environments has reached high levels, and in many areas has seriously jeopardized drinking water aquifers and reservoirs. TCE is a suspected human carcinogen and remains the number one priority pollutant on the National Priority List of the U.S. Environmental Protection Agency.

When the discovery of the magnitude of chlorinated contamination in aquifer systems in the United States, and worldwide, came to light in the early 1980s, few approaches were developed to aggressively remediate the chlorinated contaminated sites. Available remediation methods for subsurface environments include air sparging of the groundwater and the vacuum extraction of contaminants from the vadose zone. These remedial strategies transfer contamination from the subsurface environment to either the air or to activated carbon which must then be landfilled or incinerated. Landfilling contaminated activated carbon transfers the contamination from one source area to another while incineration is costly and requires considerable energy and costly equipment to completely volatilize organic compounds. Treatment strategies based on oxidation of contaminants that use ultraviolet radiation in combination with a chemical oxidant like hydrogen peroxide are also energy costly and require the injection of expensive chemicals.

Bioremediation is a method of harnessing the ability of microorganisms to degrade toxic pollutants. Anaerobic biodegradation of TCE usually results in the formation of harmful metabolites such as dichloroethylenes and the known carcinogen vinyl chloride.

The ability of aerobic methane-utilizing bacteria to degrade TCE cometabolically is known. However, the use of methane-utilizing bacteria is limited due to the toxic effects of chlorinated hydrocarbons like TCE in rather low concentrations. As disclosed by Broholm et al., "Toxicity of 1,1, 1-Trichloroethane and Trichloroethene on a Mixed Culture of Methane-Oxidizing Bacteria", *Applied and Environmental Microbiology*, August. 1990, p. 2498–2493, the toxic effects of trichloroethene become substantial above 6 mg per liter (ppm) in water. In addition, trace amounts of copper have proven to inhibit methane monooxygenase.

The use of methane-utilizing bacteria to degrade TCE is disclosed in several patents. For example, U.S. Pat. No. 5,037,5:51 to Barkley and U.S. Pat. No. 5,057,221 to Bryant et al. disclose ex-situ bioreactors using a rigid substrate bed to support aerobic methanotrophilc microoirganisms which degrade halogenated organic compounds. The substrate bed mail be made of manufactured solid material, such as activated carbon particles or contoured plastic spheres. In each of these patents, examples are provided wherein methane is supplied to an ex-situ bioreactor to degrade the halogenated organic compounds. In addition, U.S. Pat. No. 5,057,221 includes an example wherein propane is supplied to the bioreactor bed.

U.S. Pat. No. 5,384,048 to Hazen et al. discloses an in-situ groundwater bioremediation apparatus and method using a methane nutrient source. Bioremediation is carried out by periodically injecting nutrient fluid into the contaminant groundwater plume to stimulate the subsurface population of the microorganisms to increase. An oxygenated fluid is also injected into the plume to allow the aerobic microorganisms to break down the contaminants. The particular microorganisms disclosed are indigenous methanotroplis capable of biodegrading TCE by a series of enzymes including methane monooxygenase which are unique to this group of bacteria.

U.S. Pat. No. 5,326,703 to Hazen et al. discloses another in-situ method for biodegrading contaminants such as TCE.

U.S. Pat. No. 5,441,887 to Hanson et al discloses an ex-situ method for biodegrading halogenated hydrocarbons by soluble methane monooxygenase. In the examples of this patent, methane is used as the food source for the methanotrophic bacteria.

U.S. Pat. No. 4,713,343 to Wilson Jr. et al. discloses a method for biodegrading halogenated hydrocarbons such as TCE. The method may be performed either in-situ or ex-situ, and uses microorganisms such as methanotrophic bacteria.

U.S. Pat. No. 5,316,940 to Georgiou et al. discloses an ex-situ packed bed bioreactor utilizing a specific mutant methanotrophic bacteria to biodegrade TCE. Methane or methanol is used as the energy source.

U.S. Pat. No. 5,342,769 to Hunter et al. discloses an ex-situ bioremediation method for removing contaminants such is TCE from groundwater. A specific natural methanogenic bacteria is used in the process, along with methane as the food source.

Each of the above-noted patents is incorporated herein by reference.

Despite these bioremediation efforts, a need still exists for the effective degradation of pollutants such as chlorinated aliphatic hydrocarbons. The present invention has been developed in view of the foregoing, and to remedy other deficiencies of the prior art.

SUMMARY OF THE INVENTION

In accordance with the present invention, butane-utilizing organisms are used to degrade pollutants such as chlorinated aliphatic hydrocarbons. Degradation may occur cometabolically or by direct metabolism. The butane-utilizing organisms of the present invention may be used for in-situ or ex-situ bioremediation of chlorinated hydrocarbon contaminants contained in air, soil and groundwater waste streams. In addition, salt- and acid-tolerant butane-utilizing bacteria may be used to restore saline and low pH groundwater systems impacted by chlorinated hydrocarbon contamination.

An object of the present invention is to provide an improved method of degrading hydrocarbon pollutants.

Another object of the present invention is to provide a bioremediation method of degrading TCE which utilizes bacteria demonstrating low TCE toxicity.

Another object of the present invention is to provide a method of degrading chlorinated aliphatic hydrocarbons with butane-utilizing bacteria by a cometabolic process.

Another object of the present invention is to provide a method of degrading chlorinated aliphatic hydrocarbons with butane-utilizing bacteria capable of directly metabolizing the hydrocarbon pollutants.

Another object of the present invention is to provide a method of degrading a hydrocarbon pollutant by treating the pollutant with butane-utilizing bacteria in the presence of oxygen for a sufficient time for the butane-utilizing bacteria to degrade the hydrocarbon pollutant.

Another object of the present invention is to provide a method of decontaminating water by treating the water with butane-utilizing bacteria to reduce or eliminate hydrocarbon pollutants contained in the water.

Another object of the present invention is to provide an ex-situ bioremediation apparatus that uses butane-utilizing bacteria and can be easily transported to various bioremediation sites.

These and other objects of the present invention will become more apparent from the following description.

DETAILED DESCRIPTION OF THE PREFERRED EMBODIMENTS

Figure 1:
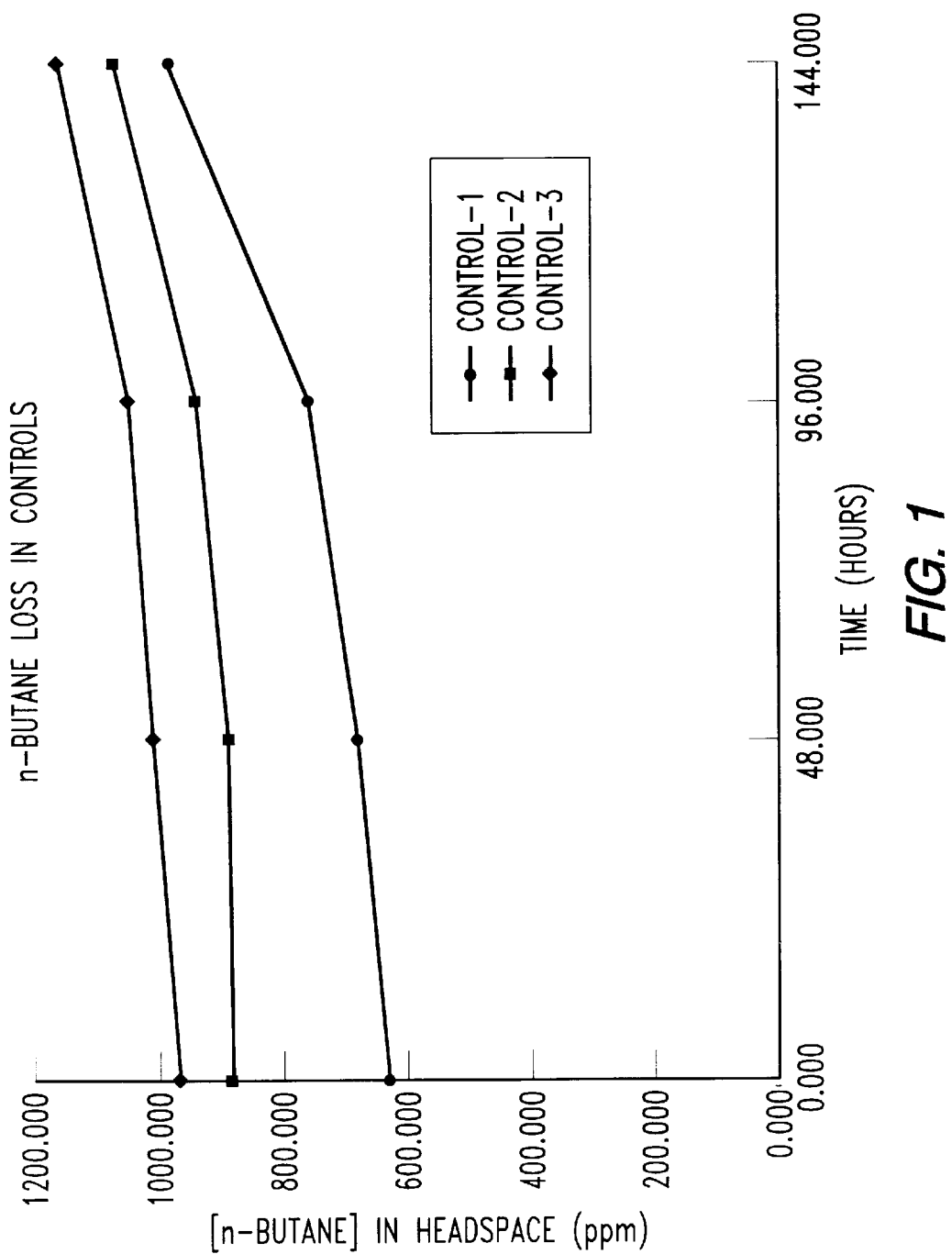
FIGS. 1 is a graph showing butane concentration at various times for experimental control samples.
Figure 2:
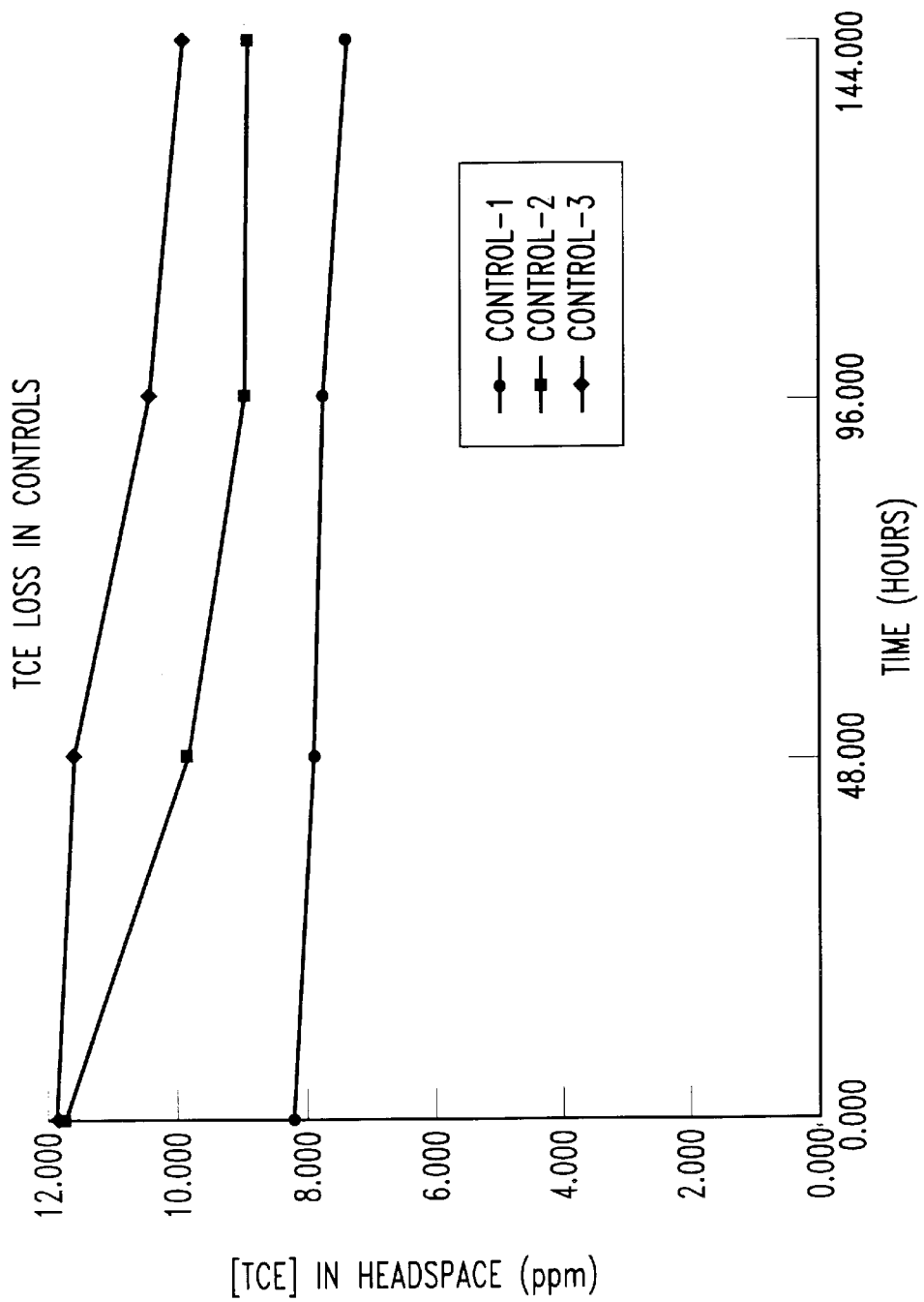
FIG. 2 is a graph showing TCE concentration at various times for experimental control samples.

The present invention relates to a method and associated apparatus for the degradation of hydrocarbon pollutants. The hydrocarbon pollutants may include chlorinated aliphatics, chlorinated aromatics and non-chlorinated aromatics, with chlorinated aliphatic hydrocarbons being of particular interest. Specific hydrocarbon pollutants include methylene chloride, 1,1-dichloroethane, chloroform, 1,2-dichloropropane, dibromochloromethane, 1,1,2-trichloroethane, 2-chloroethylvinyl ether, tetrachloroethene (PCE), chlorobenzene, 1,2-dichloroethane, 1,1,1-trichloroethane, bromodichloromethane, trans-1,3-dichloropropene, cis-1,3-dichloropropene, bromoform, benzene, toluene, ethylbenzene, xylenes, chloromethane, bromomethane, vinyl chloride, chloroethane, 1,1-dichloroethene, trans-1,2-dichloroethene, trichloroethene (TCE), dichlorobenzenes, cis-1,2-dichloroethene, dibromomethane, 1,4-dichlorobutane, 1,2,3-trichloropropane, bromochloromethane, 2,2-dichloropropane, 1,2-dibromoethane, 1,3-dichloropropane, bromobenzene, chlorotoluenes, trichlorobenzenes, trimethylbenzenes, trans-1,4-dichloro-2-butene and butylbenzenes. Trichloroethene is a particular hydrocarbon pollutant that may be degraded in accordance with the present invention.

The bioremediation process may be performed either in-situ or ex-situ to remove contaminants from various environments including aqueous systems. Aqueous systems suitable for treatment include drinking water, groundwater, industrial waste water and the like.

According to an embodiment of the present invention, it has been discovered that butane-utilizing bacteria are extremely effective at degrading low molecular weight halogenated aliphatic hydrocarbons such as TCE. The butane-utilizing bacteria may be used to aerobically degrade TCE by cometabolism and/or direct metabolism processes.

In contrast with conventional bioremediation techniques which typically use methane-utilizing bacteria to degrade TCE, the present invention provides a robust system using butane-utilizing bacteria having low TCE toxicity and improved TCE consumption capabilities.

The butane-utilizing bacteria of the present invention produce oxygenase enzymes and are capable of metabolizing butane. The operative enzymes may include extracellular enzymes, intracellular enzymes and cell-bound enzymes. The butane-utilizing bacteria typically produce butane monooxygenase and/or butane dioxygenase enzymes, and in some embodiments may also be capable of producing dehalogenase enzymes which directly metabolize TCE.

The butane-utilizing bacteria of the present invention may contain gram negative and gram positive aerobic rods and cocci, facultative anaerobic tram negative rods, non-photosynthetic, non-fruiting gliding bacteria and irregular non-sporing gram positive rods.

Of the Pseudomonadaceae family comprising gram-negative aerobic rods and cocci, species of the following genera may be suitable: Pseudomonas; Variovorax; Chryseobacterium; Comamonas; Acidovorax; Stenotrophomonas; Sphingobacterium; Xanthomonas; Frateuria; Zoogloea; Alcaligenes; Flavobacterium; Detxia; Lampropedia; Brucella; Xanthobacter; Thermuis; Thermomicrobium; Halomonas; Alteromonas; Serpens; Janthinobacterium; Bordetella; Paracoccus; Beijerinckia; and Francisella.

Of the Nocardioform Actinomycetes family comprising gram-positive Eubacteria and Actinomycetes, the following genera may be suitable: Nocardia; Rhodococcus; Gordona; Nocardioides; Saccharopolyspora; Micropolyspora; Promicromonospora; Intrasporangium; Pseudonocardia; and Oerskovia.

Of the Micrococcaceae family comprising gram-positive cocci, the following genera may be suitable: Micrococcus; Stomatococcus; Planococcus; Staphylococcus; Aerococcus; Peptococcus; Peptostreptococcus; Coprococcus; Gemella; Pediococcus; Leuconostoc; Ruminococcus; Sarcina; and Streptococcus.

Of the Vibrionaceae family comprising facultative anaerobic gram-negative rods, the following genera may be suitable: Aeromonas; Photobacterium; Vibrio; Plesiomonas; Zymomonas; Chromobacterium; Cardiobacterium; Calymmatobacterium; Streptobacillus; Eikenella; and Gardnerella.

Of the Rhizobiaceae family comprising gram-negative aerobic rods and cocci, the following genera may be suitable: Phyllobacterium; Rhizobium; Bradyrhizobium; and Agrobacterium.

Of the Cytophagaceae family comprising non-photosynthetic, gliding bacteria, non-fruiting, the following genera may be suitable: Cytophaga; Flexibacter; Saprospira; Flexithrix; Herpetosiphon; Capnocytophaga; and Sporocytophaga.

Of the Corynebacterium family comprising irregular, non-sporing gram-positive rods, the following genera may be suitable: Aureobacterium; Agromyces; Arachnia; Rothia; Acetobacterium; Actinonlyces; Arthrobactera; Arcanobacterium; Lachnospira; Propionibacterium; Eubacterium; Butyrivibria; Brevibacterium; Bifidobacterium; Microbacterium; Caseobacter; and Thermoanaerobacter.

The following isolation techniques were used for obtaining pure and mixed cultures of various methane-, propane- and butane-utilizing bacteria. Enrichment procedures were used to increase bacterial population for a given growth substrate. Soil samples collected from a variety of sites underwent enrichment transfers weekly for a period of one year. The methods and materials used for the enrichment studies are described below.

Soil samples were collected with a stainless-steel hand auger at depths that varied between one to two feet. The soils samples were stored in dedicated glass containers and moistened with sterile deionized/distilled water for transport to the laboratory. The hand auger was decontaminated between sampling locations with three Alconox soap/distilled water rinses. Soil samples used as inocula were collected from the locations summarized in Table 1.

TABLE 1

| Sample Number/Matrix | Sample Location |
| --- | --- |
| 1/soil | Landfill cell |
| 2/soil | #2 fuel oil impacted soil |
| 3/soil | Landfill cell |
| 4/soil | Gasoline and waste oil impacted soils |
| 5/soil | Shallow freshwater lagoon |
| 6/soil | Salt marsh |
| 7/soil | Industrial outfall |
| 8/soil | #2 fuel oil impacted soil |

Cultures were transferred weekly for a period of one year in liquid media to increase the relative numbers of methane-, propane- and butane-utilizing bacteria. The liquid media was a mineral salts media (MSM) prepared from the following chemicals:

$MgSO_4\text{-}7H_2O$ 1.0 g;

$CaCl_2$ 0.2 g;

$NH_4Cl$ 0.5 g;

$FeCl_3\text{-}6H_2O$ 4.0 mg;

Trace elements solution 0.5 ml; and

Distilled water 900 ml.

A trace elements solution, which provides micronutrients for bacterial growth, was prepared comprising the following ingredients:

$ZnCl_2$ 5.0 mg;

$MnCl_2\text{-}4H_2O$ 3.0 mg;

$H_3BO4$ 30.0 mg;

$NiCl_2\text{-}6H_2O$ 2.0 mg;

$(NH_4)_6Mo_7O_{24}\text{-}4H_2O$ 2.25 mg; and

Distilled water 1000 ml.

The pH of the MSM was adjusted to 6.8 before autoclaving (20 min at 121 degree C.) with 20.0 ml of a phosphate buffer solution comprising 3.6 g of $Na_2HPO_4$ and 1.4 g of $KH_2PO_4$ in 100 ml of distilled water. After autoclaving the MSM and the buffer solution, another 2.0 ml of the buffer solution was added to the MSM when the temperature of the media reached 60 degree C. The MSM cocktail was completed with the addition of 4.0 mg of casamino acids and 4.0 mg of yeast (Difco) dissolved in 100 ml of distilled water. The nutrient solution was filter sterilized by vacuum filtration through a 0.2 micron filter (Gelman) prior to addition to the MSM.

Prior to the first enrichment transfer, the inocula from the eight sampling locations summarized in Table 1 underwent a series of pre-treatments. The first two pre-treatments were conducted on the original soil materials used as inocula. The last two treatments were applied as MSM alterations during the weekly transfers. The pre-treatments consisted of the following: (1) 30% ethanol saturation rinse followed by a sterile phosphate buffer rinse (ethanol); (2) 60° C. water bath for 15 minutes (heat); (3) no treatment (no-treat); (4) MSM containing 10% aqueous solution of sodium chloride (10% NaCl); and (5) MSM with pH of 2.0 (pH of 2). Treatment Nos. (4) and (5) were employed in an attempt to locate extreme halophiles and acidophiles capable of utilizing hydrocarbons as a growth substrate.

The first enrichment transfers for each sample series were conducted in 72 ml serum bottles (Wheaton) with 20 ml of MSM and 1.0 g of inocula. Subsequent culture transfers (5.0 ml) were conducted with sterilized plastic syringes (B&D). The bottles were capped with red rubber plugs and crimped with aluminum seals (Wheaton). Each sample was handled aseptically and all glassware, materials and supplies were sterilized by autoclaving. Table 2 summarizes the enrichment transfer schedule and the concentration of methane or propane replaced in the headspace of each serum bottle using a dedicated gas tight syringe (Hamilton) with a Fisher Scientific inert sampling valve (on/off lever) to control gas loss from the needle tip between each transfer.

TABLE 2

| Sample No. | Pre-Treatment | Food Source | Sample ID |
| --- | --- | --- | --- |
| 1 | ethanol | methane | 1EM |
| 1 | heat | methane | 1HM |
| 1 | no-treat | methane | 1NM |
| 1 | 10% NaCl | methane | 1SM |
| 1 | pH of 2.0 | methane | 1AM |
| 1 | ethanol | propane | 1EP |
| 1 | heat | propane | 1HP |
| 1 | no-treat | propane | 1NP |
| 1 | 10% NaCl | propane | 1SP |
| 1 | pH of 2.0 | propane | 1AP |

The amount of oxygen required for mineralization of methane, butane can be derived from the following equations.

$$CH_4 + 2O_2 = CO_2 + 2H_2O \qquad 2:1$$

$$C_3H_8 + 5O_23 = CO_2 + 4H_2O \qquad 5:1$$

$$C_4H_{10} + 6.5O_2 = 4CO2 + 5H_2O \qquad 6.5:1$$

Table 2 summarizes the entire set of enrichment transfers prepared for Sample No. 1. The first sample series did not include a butane treatment. The remaining seven samples were prepared in identical fashion and, in addition, contained a butane treatment series, as shown in Tables 3 through 9. A control (serum bottle with sterilized MSM only) was maintained for each sample series.

All hydrocarbon gases described herein were research grade quality (Scott Specialty Gases). Methane was added at a concentration of 27% (vol/vol), propane at 10% and butane at 6%. After the first six months of enrichment transfers, the concentrations were reduced to 13% for methane and 9% for propane. The concentration of butane remained the same at 6%.

TABLE 3

| Sample No. | Pre-Treatment | Food Source | Sample ID |
|---|---|---|---|
| 2 | ethanol | methane | 2EM |
| 2 | heat | methane | 2HM |
| 2 | no-treat | methane | 2NM |
| 2 | 10% NaCl | methane | 2SM |
| 2 | pH of 2.0 | methane | 2AM |
| 2 | ethanol | propane | 2EP |
| 2 | heat | propane | 2HP |
| 2 | no-treat | propane | 2NP |
| 2 | 10% NaCl | propane | 2SP |
| 2 | pH of 2.0 | propane | 2AP |
| 2 | ethanol | butane | 2EB |
| 2 | heat | butane | 2HB |
| 2 | no-treat | butane | 2NB |
| 2 | 10% NaCl | butane | 2SB |
| 2 | pH of 2.0 | butane | 2AB |

TABLE 4

| Sample No. | Pre-Treatment | Food Source | Sample ID |
|---|---|---|---|
| 3 | ethanol | methane | 3EM |
| 3 | heat | methane | 3HM |
| 3 | no-treat | methane | 3NM |
| 3 | 10% NaCl | methane | 3SM |
| 3 | pH of 2.0 | methane | 3AM |
| 3 | ethanol | propane | 3EP |
| 3 | heat | propane | 3HP |
| 3 | no-treat | propane | 3NP |
| 3 | 10% NaCl | propane | 3SP |
| 3 | pH of 2.0 | propane | 3AP |
| 3 | ethanol | butane | 3EB |
| 3 | heat | butane | 3HB |
| 3 | no-treat | butane | 3NB |
| 3 | 10% NaCl | butane | 3SB |
| 3 | pH of 2.0 | butane | 3AB |

TABLE 5

| Sample No. | Pre-Treatment | Food Source | Sample ID |
|---|---|---|---|
| 4 | ethanol | methane | 4EM |
| 4 | heat | methane | 4HM |
| 4 | no-treat | methane | 4NM |
| 4 | 10% NaCl | methane | 4SM |
| 4 | pH of 2.0 | methane | 4AM |
| 4 | ethanol | propane | 4EP |
| 4 | heat | propane | 4HP |
| 4 | no-treat | propane | 4NP |
| 4 | 10% NaCl | propane | 4SP |
| 4 | pH of 2.0 | propane | 4AP |
| 4 | ethanol | butane | 4EB |
| 4 | heat | butane | 4HB |
| 4 | no-treat | butane | 4NB |
| 4 | 10% NaCl | butane | 4SB |
| 4 | pH of 2.0 | butane | 4AB |

TABLE 6

| Sample No. | Pre-Treatment | Food Source | Sample ID |
|---|---|---|---|
| 5 | ethanol | methane | 5EM |
| 5 | heat | methane | 5HM |
| 5 | no-treat | methane | 5NM |
| 5 | 10% NaCl | methane | 5SM |
| 5 | pH of 2.0 | methane | 5AM |

TABLE 6-continued

| Sample No. | Pre-Treatment | Food Source | Sample ID |
|---|---|---|---|
| 5 | ethanol | propane | 5EP |
| 5 | heat | propane | 5HP |
| 5 | no-treat | propane | 5NP |
| 5 | 10% NaCl | propane | 5SP |
| 5 | pH of 2.0 | propane | 5AP |
| 5 | ethanol | butane | 5EB |
| 5 | heat | butane | 5HB |
| 5 | no-treat | butane | 5NB |
| 5 | 10% NaCl | butane | 5SB |
| 5 | pH of 2.0 | butane | 5AB |

TABLE 7

| Sample No. | Pre-Treatment | Food Source | Sample ID |
|---|---|---|---|
| 6 | ethanol | methane | 6EM |
| 6 | heat | methane | 6HM |
| 6 | no-treat | methane | 6NM |
| 6 | 10% NaCl | methane | 6SM |
| 6 | pH of 2.0 | methane | 6AM |
| 6 | ethanol | propane | 6EP |
| 6 | heat | propane | 6HP |
| 6 | no-treat | propane | 6NP |
| 6 | 10% NaCl | propane | 6SP |
| 6 | pH of 2.0 | propane | 6AP |
| 6 | ethanol | butane | 6EB |
| 6 | heat | butane | 6HB |
| 6 | no-treat | butane | 6NB |
| 6 | 10% NaCl | butane | 6SB |
| 6 | pH of 2.0 | butane | 6AB |

TABLE 8

| Sample No. | Pre-Treatment | Food Source | Sample ID |
|---|---|---|---|
| 7 | ethanol | methane | 7EM |
| 7 | heat | methane | 7HM |
| 7 | no-treat | methane | 7NM |
| 7 | 10% NaCl | methane | 7SM |
| 7 | pH of 2.0 | methane | 7AM |
| 7 | ethanol | propane | 7EP |
| 7 | heat | propane | 7HP |
| 7 | no-treat | propane | 7NP |
| 7 | 10% NaCl | propane | 7SP |
| 7 | pH of 2.0 | propane | 7AP |
| 7 | ethanol | butane | 7EB |
| 7 | heat | butane | 7HB |
| 7 | no-treat | butane | 7NB |
| 7 | 10% NaCl | butane | 7SB |
| 7 | pH of 2.0 | butane | 7AB |

TABLE 9

| Sample No. | Pre-Treatment | Food Source | Sample ID |
|---|---|---|---|
| 8 | ethanol | methane | 8EM |
| 8 | heat | methane | 8HM |
| 8 | no-treat | methane | 8NM |
| 8 | 10% NaCl | methane | 8SM |
| 8 | pH of 2.0 | methane | 8AM |
| 8 | ethanol | propane | 8EP |
| 8 | heat | propane | 8HP |
| 8 | no-treat | propane | 8NP |
| 8 | 10% NaCl | propane | 8SP |
| 8 | pH of 2.0 | propane | 8AP |
| 8 | ethanol | butane | 8EB |
| 8 | heat | butane | 8HB |

TABLE 9-continued

| Sample No. | Pre-Treatment | Food Source | Sample ID |
|---|---|---|---|
| 8 | no-treat | butane | 8NB |
| 8 | 10% NaCl | butane | 8SB |
| 8 | pH of 2.0 | butane | 8AB |

After the first two weeks of enrichment transfers, all liquid suspensions, with the exception of the 10% NaCl treatments, the 2.0 pH treatments and the controls, demonstrated a significant increase in turbidity.

After conducting the enrichment transfers for 25 weeks, morphological descriptions and direct cell counts were compiled for all isolates. Morphological descriptions of the isolates were compiled using an Olympus BH-2 Phase Contrast Microscope. In addition, a Bright Line Hemacytometer (Fisher Scientific) was used to enumerate cell densities by the direct count method. Table 10 summarizes the descriptions and cell density enumerations. Serum bottles of sterilized MSM were maintained as controls.

TABLE 10

| Sample ID | Morphology | Enumeration (cells/ml) |
|---|---|---|
| 1EM | cocci | 2.5E8 |
| 1HM | cocci/bacilli | 1.8E8 |
| 1NM | bacilli | 1.3E8 |
| 1SM | cocci | 5.8E6 |
| 1AM | cocci | 3.8E6 |
| 1EP | bacilli | 4.0E6 |
| 1HP | cocci | 1.3E7 |
| 1NP | bacilli | 9.8E6 |
| 1SP | diplococci | 4.0E6 |
| 1AP | bacilli (variable) | 1.5E8 |
| 2EM | cocci/bacilli | 1.2E8 |
| 2HM | cocci/bacilli | 7.3E7 |
| 2NM | streptococci/bacilli | 1.1E8 |
| 2SM | comma-shaped | 6.6E7 |
| 2AM | comma-shaped | 8.3E6 |
| 2EP | bacilli | 1.2E8 |
| 2HP | bacilli/comma-shaped | 1.8E8 |
| 2NP | bacilli (variable) | 1.1E8 |
| 2SP | cocci | 7.0E6 |
| 2AP | cocci | 3.3E6 |
| 2EB | cocci/bacilli | 2.1E8 |
| 2HB | bacilli (variable) | 2.5E8 |
| 2NB | cocci/comma-shaped | 1.9E8 |
| 2SB | bacilli | 2.5E6 |
| 2AB | cocci | 3.0E6 |
| 3EM | cocci/bacilli | 1.4E8 |
| 3HM | cocci | 1.2E8 |
| 3NM | cocci | 5.8E7 |
| 3SM | cocci | 7.5E5 |
| 3AM | cocci | 7.5E5 |
| 3EP | bacilli | 7.8E7 |
| 3HP | bacilli | 3.0E7 |
| 3NP | bacilli | 7.1E7 |
| 3SP | cocci | 1.0E6 |
| 3AP | bacilli | 2.5E5 |
| 3EB | bacilli (variable) | 1.5E8 |
| 3HB | cocci/bacilli | 3.1E7 |
| 3NB | cocci | 3.1E8 |
| 3SB | cocci (irregular) | 1.7E7 |
| 3AB | cocci/bacilli | 2.5E5 |
| 4EM | cocci (variable) | 1.6E8 |
| 4HM | diplococci | 3.1E8 |
| 4NM | cocci | 1.6E8 |
| 4SM | cocci | 1.3E6 |
| 4AM | bacilli | 2.5E5 |
| 4EP | bacilli (variable) | 1.0E8 |
| 4HP | bacilli (variable) | 2.2E8 |
| 4NP | cocci | 1.3E8 |
| 4SP | cocci | 1.5E6 |
| 4AP | cocci/bacilli | 6.5E6 |
| 4EB | bacilli | 3.6E8 |
| 4HB | bacilli (variable) | 4.8E8 |
| 4NB | bacilli | 2.6E8 |
| 4SB | comma-shaped | 1.3E6 |
| 4AB | cocci | 1.0E6 |
| 5EM | cocci (variable) | 1.3E8 |
| 5HM | cocci | 1.4E8 |
| 5NM | cocci | 2.4E8 |
| 5SM | no cells | 0.0 |
| 5AM | no cells | 0.0 |
| 5EP | cocci (variable) | 5.1E7 |
| 5HP | bacilli | 3.2E7 |
| 5NP | streptococci | 2.1E8 |
| 5SP | cocci (variable) | 2.8E6 |
| 5AP | bacilli | 5.0E5 |
| 5EB | bacilli | 3.1E8 |
| 5HB | cocci | 3.2E7 |
| 5NB | cocci | 1.6E8 |
| 5SB | bacilli | 1.0E6 |
| 5AB | cocci | 2.5E6 |
| 6EM | bacilli (variable) | 1.7E8 |
| 6HM | cocci | 2.6E8 |
| 6NM | cocci/spirochetes | 1.3E8 |
| 6SM | cocci (variable) | 1.3E6 |
| 6AM | cocci (variable) | 2.0E6 |
| 6EP | bacilli | 2.8E7 |
| 6HP | bacilli | 1.3E8 |
| 6NP | bacilli/spirochetes | 2.0E8 |
| 6SP | cocci (variable) | 3.5E6 |
| 6AP | cocci (variable) | 5.0E5 |
| 6EB | cocci | 3.5E7 |
| 6HB | bacilli | 1.3E8 |
| 6NB | bacilli | 4.8E7 |
| 6SB | cocci | 2.3E6 |
| 6AB | cocci | 3.3E6 |
| 7EM | streptococci | 1.3E8 |
| 7HM | staphylococci | 3.2E7 |
| 7NM | cocci/bacilli | 3.1E8 |
| 7SM | cocci (variable) | 3.0E6 |
| 7AM | cocci (variable) | 4.0E6 |
| 7EP | bacilli | 1.4E8 |
| 7HP | bacilli | 4.1E8 |
| 7NP | bacilli | 3.5E8 |
| 7SP | cocci (variable) | 1.2E7 |
| 7AP | cocci (variable) | 1.5E6 |
| 7EB | bacilli (variable) | 1.6E8 |
| 7HB | bacilli (variable) | 3.9E8 |
| 7NB | bacilli | 4.2E8 |
| 7SB | cocci (variable) | 4.3E6 |
| 7AB | cocci (variable) | 2.8E6 |
| 8EM | cocci | 5.6E7 |
| 8HM | cocci | 6.1E7 |
| 8NM | cocci | 5.7E7 |
| 8SM | cocci (variable) | 5.3E6 |
| 8AM | bacilli | 2.3E6 |
| 8EP | bacilli | 1.4E8 |
| 8HP | cocci | 3.8E8 |
| 8NP | cocci | 2.9E8 |
| 8SP | square-shaped | 6.5E6 |
| 8AP | cocci (variable) | 3.8E6 |
| 8EB | bacilli | 1.3E8 |
| 8HB | bacilli/streptococci | 9.8E7 |
| 8NB | bacilli (variable) | 1.2E8 |
| 8SB | bacilli (variable) | 2.0E6 |
| 8AB | cocci (variable) | 2.8E6 |
| Control-1 | no cells | 0.0 |
| Control-2 | no cells | 0.0 |
| Control-3 | no cells | 0.0 |

Sample ID strains 3NB and 6NB were placed on deposit with the American Type Culture Collection (ATCC), Rockville, Md. on Aug. 22, 1996, under ATCC designation numbers 55808 and 55809, respectively.

A microcosm study using static headspace methods was conducted to evaluate methane, propane and butane consumption and TCE degradation rates for selected isolates. Static headspace involves a partitioning of volatile components between the aqueous and vapor phases enclosed in a gas tight vessel such as a serum bottle.

Each microcosm contained 25 ml of MSM and inoculum in a 72 ml serum bottle, thus yielding an effective headspace of 47 ml. Low concentrations of research grade methane, propane or n-butane ranging from 200 to 1,200 parts per million (ppm) were added to the headspace in their respective microcosms, in contrast to concentrations used during enrichment transfers, in order to avoid saturating enzyme sites with the growth substrate which would reduce cometabolic rates. A TCE concentration in the range of 2 to 12 ppm was added to the headspace of each microcosm. According to Henry's Law, the TCE concentration in the headspace would yield a corresponding concentration of approximately 4 to 24 ppm in the aqueous phase. Hydrocarbon and TCE disappearance were evaluated at times 0, 48 and 96 hours for the methane and propane microcosms. TCE and n-butane disappearance was evaluated at times 0, 48, 96 and 144 hours. Serum bottles containing sterilized MSM and methane, MSM and propane, MSM and n-butane, and MSM and TCE were maintained as controls. The serum bottles were capped with gray butyl rubber plugs coated with Teflon and crimped with aluminum seals (Wheaton). The serum bottle caps were coated with paraffin wax and stored in an inverted position in a water bath. A 250-microliter headspace sample from each serum bottle (after 2 min agitation of bottle) was analyzed using a Photovac 10S Plus gas chromatograph (GC) equipped with a photoionization detector (PID), an isothermal oven and a CP-Sil 5 CB capillary column. Duplicate analyses were conducted on each sample. Gas-tight Hamilton syringes with Fisher Scientific inert sampling valves comprising an on/off lever were used fir on-column injections. The following GC parameters were employed for the microcosm evaluation:

Oven temperature 40 degrees C.;

Detector flow 10 ml/min;

Backflush flow 10 ml/min;

Carrier gas ultra zero air (certified <0.1 ppm total hydrocarbons);

TCE detection limit 0.0588 parts per billion (ppb);

Methane detection limit 100 ppb;

Propane detection limit 75 ppb; and

N-butane detection limit 50 ppb.

The results of the microcosm studies evaluating and comparing the TCE degradation rates of methane-, propane- and butane-utilizing bacteria are described below.

Table 11 summarizes the microcosm evaluation of methane consumption and TCE disappearance for selected isolates, given in ppm. Regression models were used to plot data to determine kinetic rates.

TABLE 11

| Sample ID | Zero Hour $CH_4$/TCE | 48 Hours $CH_4$/TCE | 96 Hours $CH_4$/TCE |
|---|---|---|---|
| 1EM | 1,144/5.909 | 1,093/3.470 | 909.5/2.854 |
| 1HM | 1,164/4.239 | 708.5/2.538 | BDL/1.563 |
| 1NM | 1,043/4.215 | 460.3/1.749 | BDL/1.107 |
| 2EM | 1,235/5.476 | 806.2/3.498 | 5.310/1.826 |
| 2HM | 1,260/5.741 | 1,310/3.955 | 972.1/2.530 |
| 2NM | 1,191/4.234 | 1,130/3.360 | BDL/2.070 |

TABLE 11-continued

| Sample ID | Zero Hour $CH_4$/TCE | 48 Hours $CH_4$/TCE | 96 Hours $CH_4$/TCE |
|---|---|---|---|
| 3EM | 1,191/5.525 | 1,179/4.008 | 559.7/2.212 |
| 3HM | 1,210/4.920 | 1,204/3.586 | 739.8/1.969 |
| 3NM | 1,147/5.678 | 1,099/3.751 | 581.91/1.815 |
| 4EM | 840/4.552 | 352.7/0.767 | BDL/0.157 |
| 4HM | 431/3.799 | 166.6/2.547 | BDL/1.520 |
| 4NM | 1,112/4.517 | 460.5/3.447 | 8.437/1.789 |
| 5EM | 1,068/9.672 | 243.5/2.681 | 8.786/1.386 |
| 5HM | 1,152/6.691 | 967.6/1.570 | BDL/0.005 |
| 5NM | 1,108/7.775 | 620.7/1.191 | 4.856/0.074 |
| 6EM | 270/4.223 | 151.6/2.956 | BDL/2.068 |
| 6HM | 1,145/4.638 | 980.9/3.570 | 123.9/1.599 |
| 6NM | 1,161/4.462 | 1,034/4.100 | 573.4/0.805 |
| 7EM | 1,218/4.687 | 1,242/3.599 | 925.3/1.640 |
| 7HM | 1,277/4.877 | 1,309/3.860 | 1,081/2.151 |
| 7NM | 464/4.337 | 163/1.903 | BDL/1.004 |
| 8NM | 1,261/4.924 | 1,260/3.608 | 1,113/1.807 |
| $CH_4$ control-1 | 1,064/— | 998/— | 1,002/— |
| $CH_4$ control-2 | 968/— | 8741— | 8791— |
| $CH_4$ control-3 | 723/— | 7461— | 721/— |
| TCE control-1 | —/7.830 | —/6.400 | —/6.200 |
| TCE control-2 | —/4.874 | —/3.770 | —/4.100 |
| TCE control-3 | —/11.69 | —/9.064 | —/10.20 |

BDL = below instrument detection limit

The average loss of methane and TCE in the control bottles was 51.0 and 1.30 ppm, respectively. Methane was completely consumed within 96 hours by the following isolates: 1HM, 1NM, 2NM, 4EM, 4HM, 5HM, 6EM and 7NM. However, the initial methane concentrations varied. A lag phase of methane consumption was observed in several isolates between zero and 48 hours, for example, 1EM, 3EM, 3HM, 3NM, 7EM, 7HM and 8NM. This lag phase apparently represents an acclimation period for the isolates and not a manifestation of the toxic effects of TCE since methane consumption resumed between hours 48 and 96.

Isolates in 4EM, cell density 1.6E8 (Table 10), had initial $CH_4$/TCE concentrations of 840/4.552 ppm, respectively, and final $CH_4$/TCE concentrations of 0/0.157 ppm. The methane consumption rate (apparent zero order kinetics) for isolate 4EM was calculated to be 8.75 mg $h^{-1}L^{-1}$, and the TCE degradation rate (first order kinetics) was 0.04 mg $h^{-1}L^{-1}$. Therefore, 219 ppm of methane was required to degrade 1.0 ppm TCE.

Isolates in 5HM, cell density 1.4E8, had initial $CH_4$/TCE concentrations of 1,152/6.691 ppm, respectively, and final $CH_4$/TCE concentrations of 0/0.005 ppm. The methane consumption rate (zero order kinetics) for isolate 5HM was calculated to be 12.0 mg $h^{-1}L^{-1}$, and the TCE degradation rate (zero order kinetics) was 0.07 mg $h^{-1}L^{-1}$. Therefore, 171 ppm of methane was required to degrade 1.0 ppm TCE.

Isolates in 5NM; cell density 2.4E8, had initial $CH_4$/TCE concentrations of 1,108/7.775 ppm, respectively, and final $CH_4$/TCE concentrations of 4.856/0.074 ppm. The methane consumption rate (apparent zero order kinetics) for isolate 5NM was calculated to be 11.5 mg $h^{-1}L^{-1}$, and the TCE degradation rate (first order kinetics) was 0.05 mg $h^{-1}L^{-1}$. Therefore, 230 ppm of methane was required to degrade 1.0 ppm TCE.

Isolates in 6NM, cell density 2.6E8, had initial $CH_4$/TCE concentrations of 1,161/4.462 ppm, respectively, and final $CH_4$/TCE concentrations of 573.4/0.805 ppm. The methane consumption rate (apparent zero order kinetics) for isolate 6NM was calculated to be 6.12 mg $h^{-1}L^{-1}$, and the TCE degradation rate (zero order kinetics) was 0.04 mg $h^{-1}L^{-1}$. Therefore, 153 ppm of methane was required to degrade 1.0 ppm TCE.

Review of the results indicate that some isolates produce enzymes that are effective at mineralizing TCE while others harvested on the same growth substrate produce enzymes that are ineffectual.

Table 12 summarizes the microcosm evaluation of propane consumption and TCE disappearance for selected isolates, given in ppm. Regression models were used to plot data to determine kinetic rates.

TABLE 12

| Sample ID | Zero Hour $C_3H_8$/TCE | 48 Hours $C_3H_8$/TCE | 96 Hours $C_3H_8$/TCE |
|---|---|---|---|
| 1HP | 1,653/4.437 | 1,055/>4.0 | 1,414/2.760 |
| 2EP | 1,099/4.226 | ***/1.496 | 1,024/0.152 |
| 2HP | 1,787/2.609 | 1,421/2.166 | 494.4/1.796 |
| 2NP | 1,730/>4.0 | 1,424/5.075 | 267.6/2.536 |
| 3HP | 1,555/1.922 | 800.9/1.812 | 17.92/1.130 |
| 3NP | 1,693/2.292 | 1,211/>2.0 | 8.612/1.328 |
| 4EP | 1,869/1.922 | 985/*** | 525.3/1.991 |
| 4HP | 1,071/1.972 | 975.6/0.724 | 646.1/0.062 |
| 4NP | 1,128/2.401 | 1,070/>2.0 | 925.4/2.536 |
| 5HP | 1,731/1.896 | 955.3/*** | 678.2/1.383 |
| 5NP | 1,837/2.468 | 865.4/>2.01 | 247.5/1.919 |
| 6EP | 1,760/*** | 1,639/12.50 | 1,402/10.0 |
| 6HP | 1,738/7.392 | ***/2.317 | 1,133/0.625 |
| 6NP | 3,458/8.061 | 1,062/5.196 | 910.1/2.562 |
| 7HP | 1,737/5.327 | BDL/3.299 | 20.70/4.583 |
| 7NP | 1,733/5.024 | BDL/*** | 15.30/4.017 |
| 8EP | 1,985/5.260 | 779.6/5.771 | 15.91/3.193 |
| 8HP | 1,806/4.772 | 1,315/>4.5 | 553.1/2.723 |
| 8NP | 1,868/4.768 | BDL/2.616 | 15.02/1.984 |
| $C_3H_8$ control-1 | 1,586/— | 1,618/— | 1,332/— |
| $C_3H_8$ control-2 | 1,732/— | 1,781/— | 1,448/— |
| $C_3H_8$ control-3 | 1,777/— | 1,879/— | 1,518/— |
| TCE control-1 | —/2.638 | —/5.416 | —/5.022 |
| TCE control-2 | —/5.280 | —/5.089 | —/7.760 |
| TCE control-3 | —/6.844 | —/10.08 | —/9.269 |

BDL = below instrument detection limit
***high standard deviation

The average loss of propane in the control bottles did not exceed 15 percent of total added over a period of 96 hours. Propane was completely consumed within 48 hours by the isolates 7HP, 7NP and 8NP. The average initial propane concentration for these three isolates was 1,770 ppm. In contrast, no selected methane-utilizing isolates achieved complete methane oxidation in less than 96 hours. The lag phase observed in the methane microcosm study between zero and 48 hours for several isolates was not apparent in the propane microcosm study. Of particular note are the isolates 4HP and 6NP. Isolates 7HP and 7NP demonstrated minimal TCE degradation averaging 20% of the total added.

Isolates in 4HP, cell density 2.2E8 (Table 10), had initial $C_3H_8$/TCE concentrations of 1,071/1.972 ppm, respectively, and final $C_3H_8$/TCE concentrations of 646.1/0.062 ppm. The propane consumption rate (apparent zero order kinetics) was calculated to be 4.43 mg $h^{-1}L^{-1}$, and the TCE degradation rate (zero order kinetics) was 0.02 mg $h^{-1}L^{-1}$. Therefore, 222 ppm of propane was required to degrade 1.0 ppm TCE.

Isolates in 6NP, cell density 2.6E8, had initial $C_4H_8$/TCE concentrations of 1,161/4.462 ppm, respectively, and final $C_4H_8$/TCE concentrations of 573.4/0.805 ppm. The propane consumption rate (apparent zero order kinetics) was calculated to be 26.5 mg $h^{-1}L^{-1}$, and the TCE degradation rate (zero order kinetics) was 0.06 mg $h^{-1}L^{-1}$. Therefore, 442 ppm of propane are required to degrade 1.0 ppm TCE. There was a nearly equivalent correlation for the linear (r=0.8914) and exponential (r=0.9140) data plots for the propane consumption rate for isolate 6NP. In addition, the data plots for the. TCE degradation rate showed the same linear (r=0.9997) and exponential (r=0.9910) trends.

Review of the results indicate that some isolates produce enzymes, as observed for the methane microcosm evaluation, that are effective at mineralizing TCE while others produce enzymes that are apparently ineffectual.

Table 13 summarizes the microcosm evaluation of n-butane consumption and TCE disappearance for selected isolates in accordance with the present invention, given in ppm. Corresponding graphs illustrating the butane microcosm results are included in FIGS. 1–16.

TABLE 13

| Sample ID | Zero Hour $C_4H_{10}$/TCE | 48 Hours $C_4H_{10}$/TCE | 96 Hours $C_4H_{10}$/TCE | 144 Hours $C_4H_{10}$/TCE |
|---|---|---|---|---|
| 2EB | 694.6/8.321 | 584.5/3.740 | 500/1.768 | BDL/0.945 |
| 2HB | 659.4/4.110 | 488.7/2.615 | BDL/1.274 | BDL/0.477 |
| 2NB | 701 9/5.415 | 616.6/≧5.0 | 452.7/2.405 | BDL/1.760 |
| 3EB | 1077/9.399 | 551 0/7.330 | 476.8/2.641 | BDL/1.260 |
| 3NB | 657.3/11.42 | 564.8/10.12 | ≧564/3.827 | 559.8/2.368 |
| 4EB | 670.3/7.065 | 544.1/1.758 | 473.2/0.774 | BDL/0.158 |
| 4HB | 709.2/6.752 | 333.7/3.006 | BDL/2.900 | BDL/1.825 |
| 4NB | 710.6/6.817 | BDL/2.750 | BDL/1.383 | BDL/1.199 |
| 5EB | 659.8/5.873 | 517.5/2.737 | BDL/2.253 | BDL/1.113 |
| 6HB | 625.9/5.508 | 576.3/1.046 | 542.4/0.142 | 397.4/BDL |
| 6NB | 675.8/5.996 | 622.0/0.836 | 620.9/0.268 | BDL/BDL |
| 7EB | 726.0/2.357 | 619.8/2.331 | BDL/≧2.300 | BDL/2.100 |
| 7HB | 656.3/5.055 | 355.0/2.703 | BDL/≧2.700 | BDL/2.648 |
| 7NB | 687.5/6.232 | 297.2/3.064 | BDL/2.440 | BDL/1.721 |
| 8EB | 651.5/2.934 | 448.5/*** | BDL/2.684 | BDL/2.446 |
| 8HB | 718.4/2.599 | 576.2/1.967 | BDL/*** | BDL/1.953 |
| Butane Control-1 | 632.0/— | 681.9/— | 762.5/— | 986.6/— |
| Butane Control-2 | 884.5/— | 889.0/— | 942.7/— | 1075/— |
| Butane Control-3 | 966.9/— | 1012/— | 1053/— | 1168/— |
| TCE Control-1 | —/8.149 | —/7.840 | —/7.717 | —/7.392 |
| TCE Control-2 | —/11.720 | —/9.831 | —/8.949 | —/8.922 |
| TCE Control-3 | —/11.835 | —/11.605 | —/10.438 | —/9.954 |

BDL = below instrument detection limit
***high standard deviation

As shown in Table 13, n-butane was completely consumed within 48 hours by 4NB and 96 hours by 2HB, 4HB, 4NB, 5EB, 7EB, 7HB and 7NB. A lag phase was not observed for growth between zero and 48 hours. According to the graphs of FIGS. 3, 5, 7, 9, 11, 13 and 15, depicting n-butane consumption versus time for selected isolates, n-butane consumption appears to follow apparent zero order kinetics, indicating that the rate of reaction may be independent of the concentration of the isolates. However, according to the graphs of FIGS. 4, 6, 8, 10, 12, 14 and 16, depicting TCE loss over time, zero and first order kinetics were observed. The occurrence of first order kinetics indicates that the TCE degradation rate may be dependent on the concentration of the isolates such that there is a linear relationship between the natural log of concentration at a given time over the initial concentration. Of particular note are the isolates 2EB, 2HB, 2NB, 3EB, 3NB, 4EB, 4HB, 4NB, 5EB, 6HB, 6NB and 7NB. The average loss of TCE in the control bottles (1–3) ranged from 9 to 23 percent.

Figure 3:
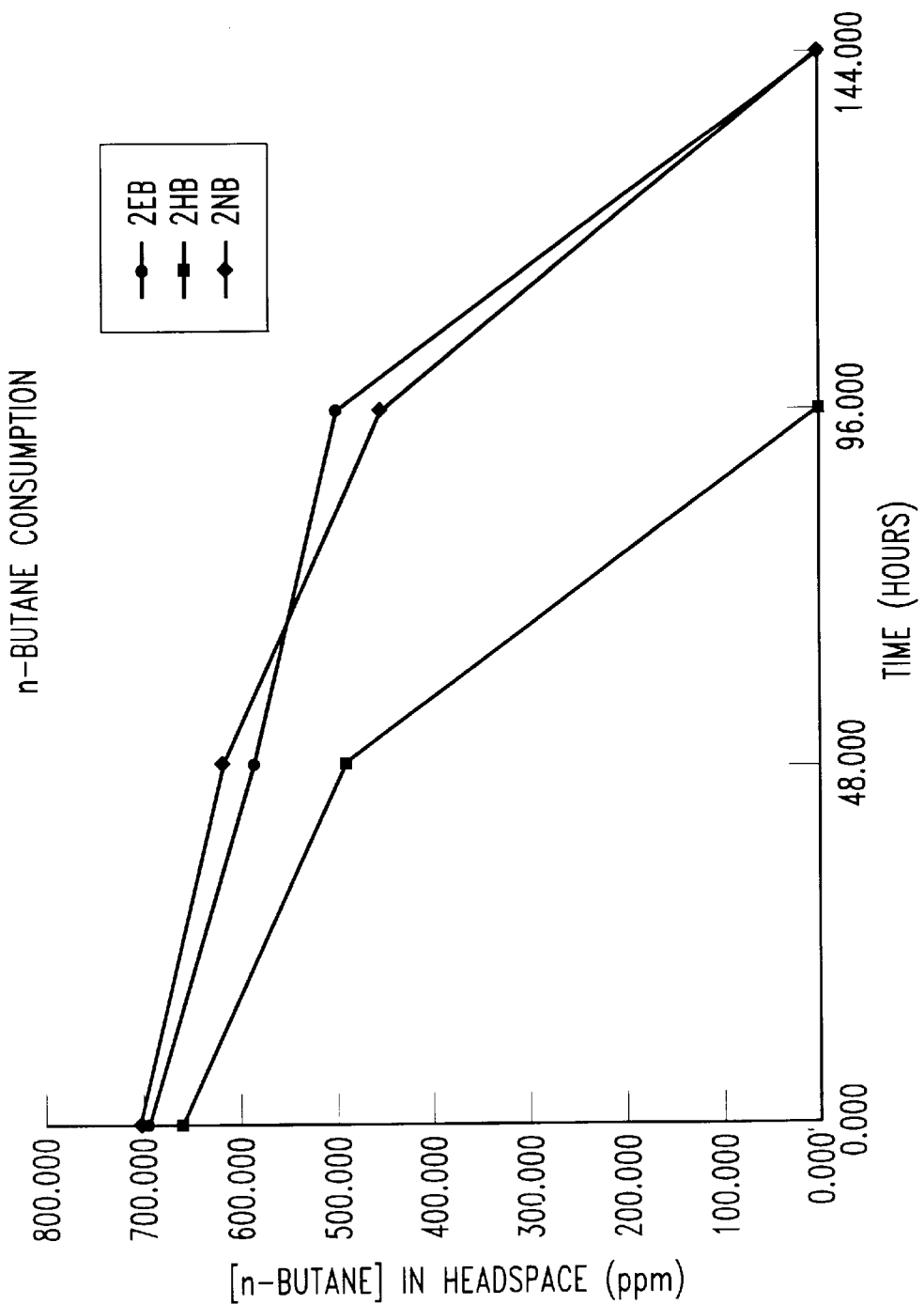
FIGS. 3–16 are graphs showing butane and TCE loss for various butane-utilizing bacteria in accordance with the present invention.
Figure 4:
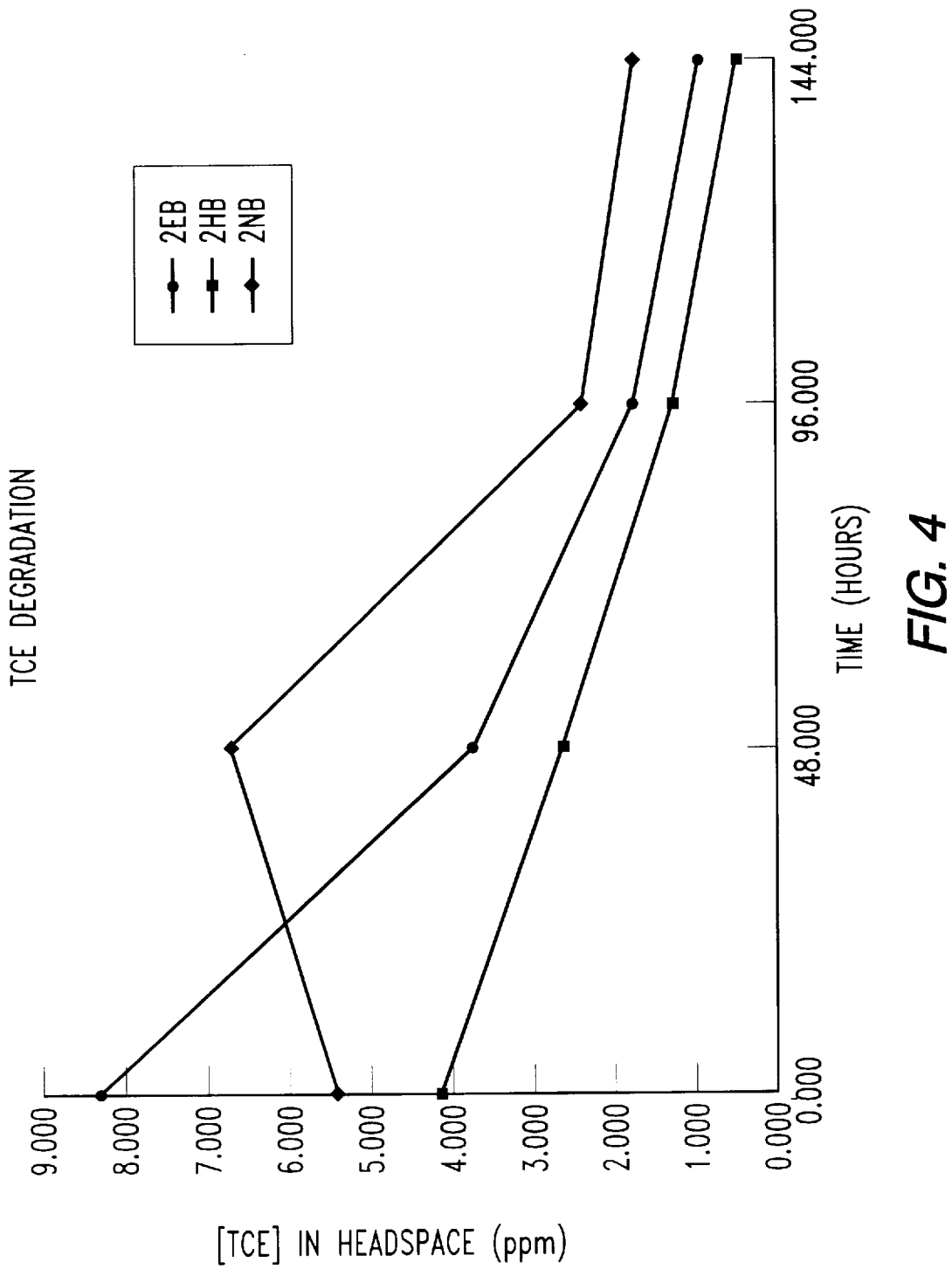

Isolates in 2EB, cell density 2.1E8 (Table 10), had initial $C_4H_{10}$/TCE concentrations of 694.6/8.321 ppm, respectively, and final $C_4H_{10}$/TCE concentrations of 0/0.945 ppm (see FIGS. 3 and 4). The n-butane consumption rate (apparent zero order kinetics) for isolate 2EB was calculated to be 4.52 mg $h^{-1}L^{-1}$, and the TCE degradation rate (first order kinetics) was 0.02 mg $h^{-1}L^{-1}$. Therefore, 226 ppm of n-butane was required to degrade 1.0 ppm TCE. Since the 2EB-containing microcosm showed no correlation between TCE and n-butane degradation, TCE apparently serves as a carbon source.

Isolates in 2HB, cell density 2.5E8, had initial $C_4H_{10}$/TCE concentrations of 659.4/4.110 ppm, respectively, and final $C_4H_{10}$/TCE concentrations of 0/0.477 ppm (see FIGS. 3 and 4). In comparison with the propane-utilizing microcosm, 2HP, that degraded 31 percent of the total TCE added, 2HB degraded 88 percent of the total added. The n-butane consumption rate (apparent zero order kinetics) for 2HB was calculated to be 5.06 mg $h^{-1}L^{-1}$, and the TCE degradation rate (zero order kinetics) was 0.03 mg $h^{-1}L^{-1}$. Therefore, 169 ppm of n-butane was required to degrade 1.0 ppm TCE. The 2HB-containing microcosm showed a good correlation between TCE and n-butane degradation characteristic of cometabolic degradation.

Isolates in 2NB, cell density 1.9E8, had initial $C_4H_{10}$/TCE concentrations of 701.9/5.415 ppm, respectively, and final $C_4H_{10}$/TCE concentrations of 0.0/1.760 ppm (see FIGS. 3 and 4). Therefore, 473 ppm of n-butane was required to degrade 1.0 ppm TCE. The propane-utilizing microcosm, 2NP, degraded 25 percent less of the total added TCE than the 2NB-containing microcosm. The n-butane consumption rate (apparent zero order kinetics) for 2HB was calculated to be 4.73 mg $h^{-1}L^{-1}$, and the TCE degradation rate (first order kinetics) was 0.01 mg $h^{-1}L^{-1}$. Since the 2NB-containing microcosm showed no correlation between TCE and n-butane degradation, it is apparent that this isolate uses TCE as a carbon source.

Figure 5:
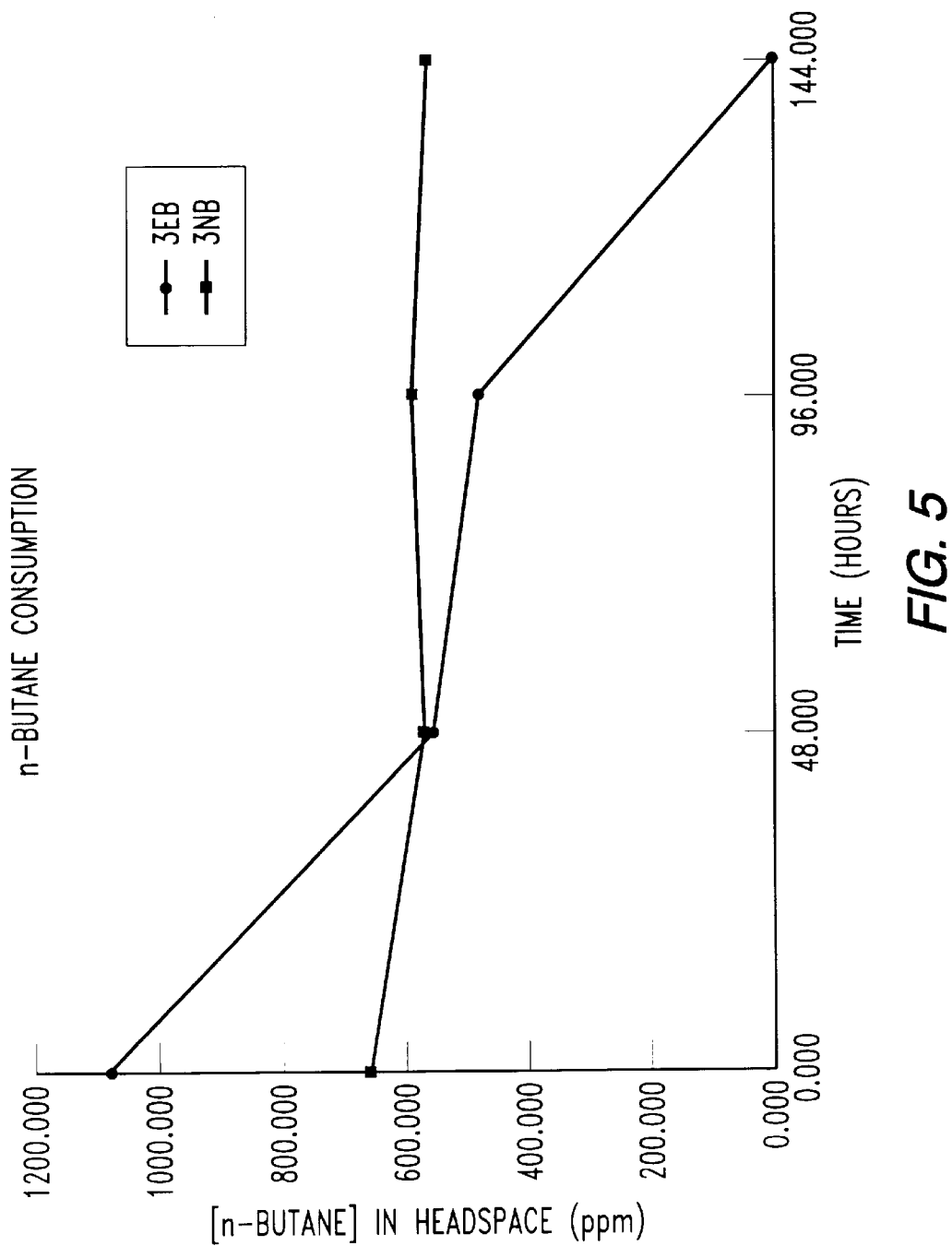
Figure 6:
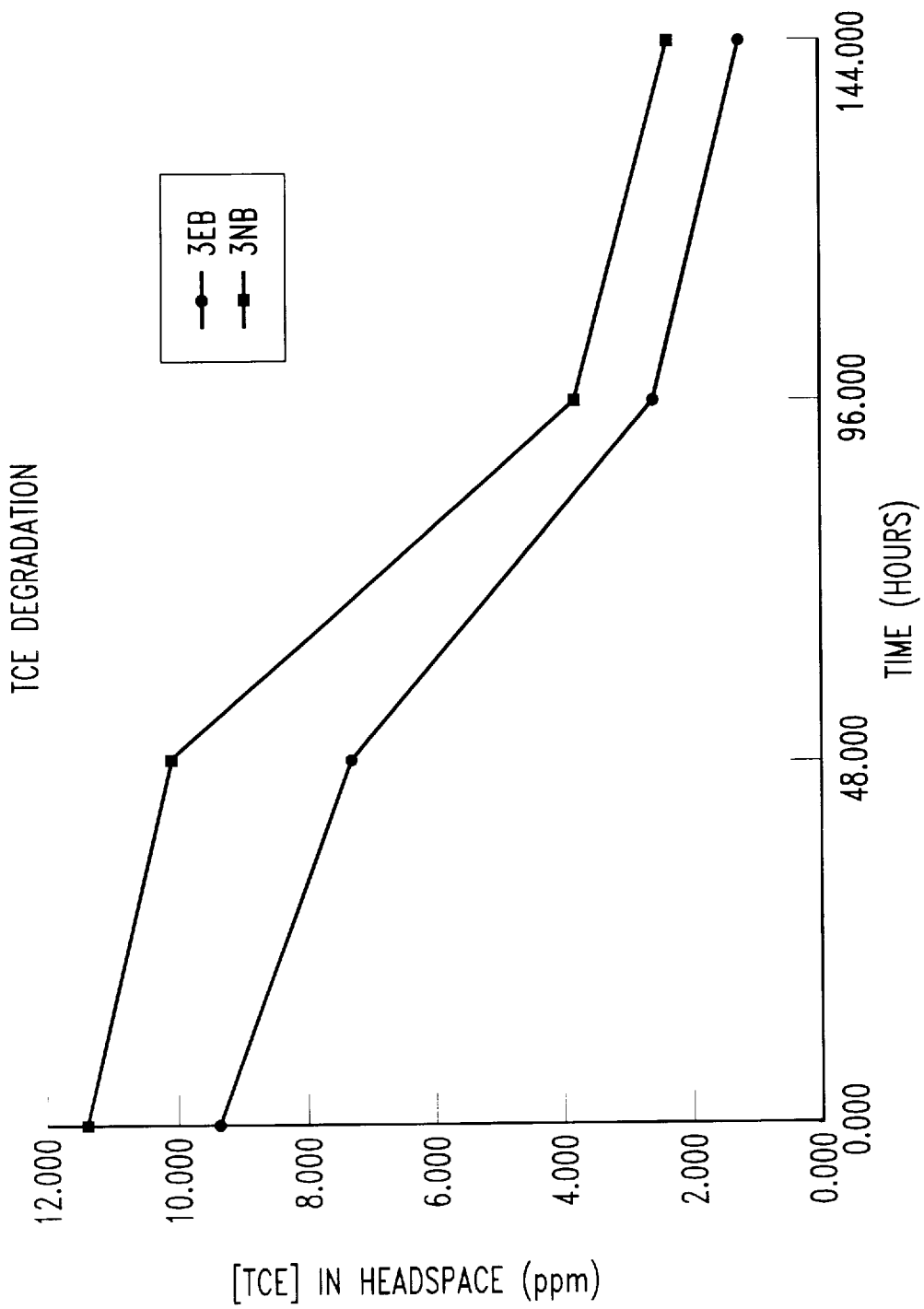

Isolates in 3EB, cell density 1.5E8, had initial $C_4H_{10}$/TCE concentrations of 1077/9.399 ppm, respectively, and final $C_4H_{10}$/TCE concentrations of 0/1.260 ppm (see FIGS. 5 and 6). Inoculum 3EB degraded 87 percent of the total TCE added. The n-butane consumption rate (apparent zero order kinetics) for 3EB was 6.89 mg $h^{-1}L^{-1}$, and the TCE degradation rate (data correlated with zero and first order kinetics) was 0.06 mg $h^{-1}L^{-1}$. Therefore, 115 ppm of n-butane was required to degrade 1.0 ppm TCE. Since the 3EB-containing microcosm showed little correlation between TCE and n-butane degradation, this isolate apparently uses TCE as a carbon source.

Isolates in 3NB, cell density 3.1E8, had initial $C_4H_{10}$/TCE concentrations of 657.3/11.42 ppm, respectively, and final $C_4H_{10}$/TCE concentrations of 559.8/2.368 ppm (see FIGS. 5 and 6). In contrast, the propane-utilizing microcosm, 3NP, degraded 42 percent of the total TCE added whereas 3NB degraded 79 percent of the total added. The TCE degradation rate was 0.01 mg $h^{-1}L^{-1}$. Therefore, 10.77 ppm of n-buulne was required to degrade 1.0 ppm TCE.

Figure 7:
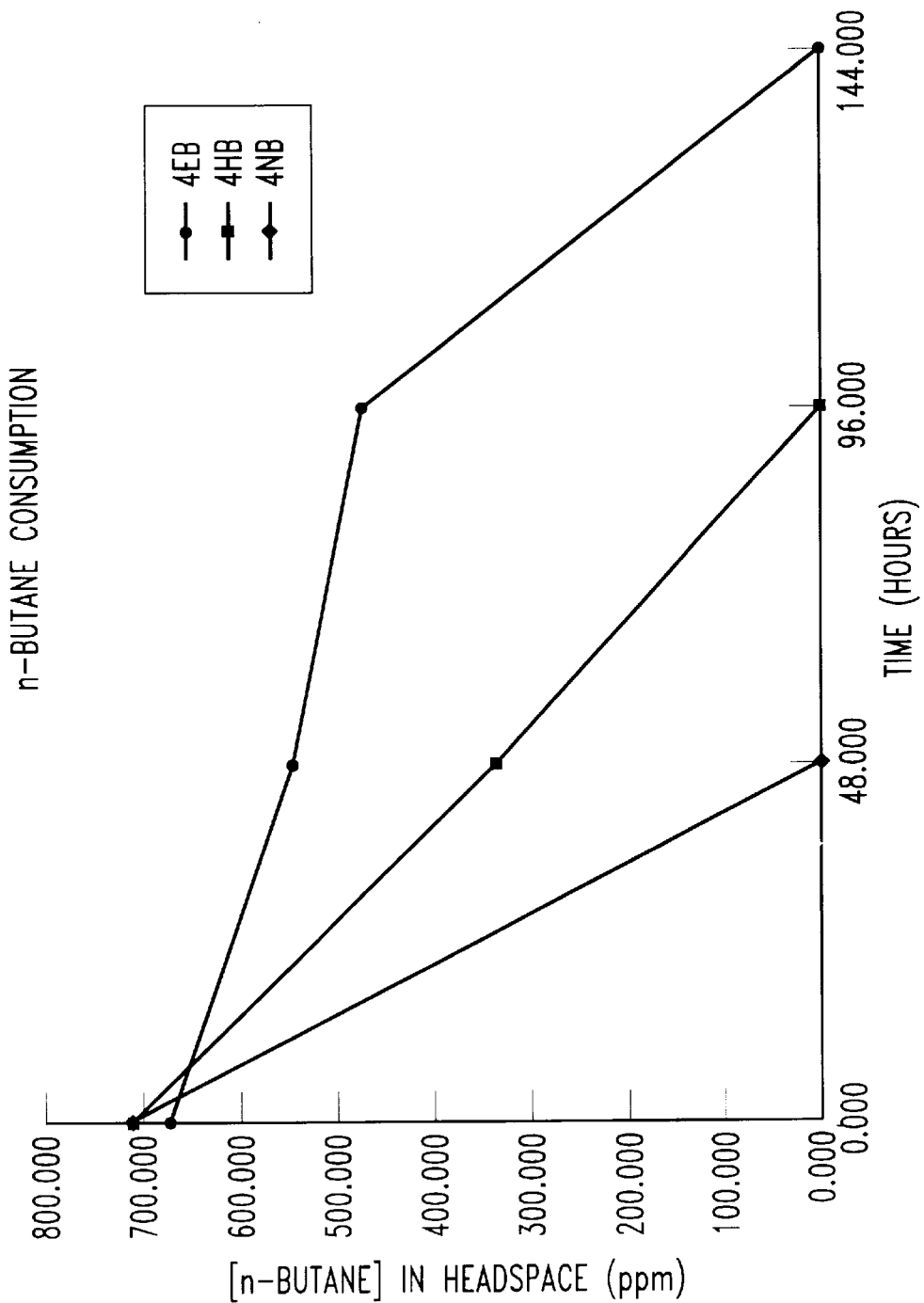
Figure 8:
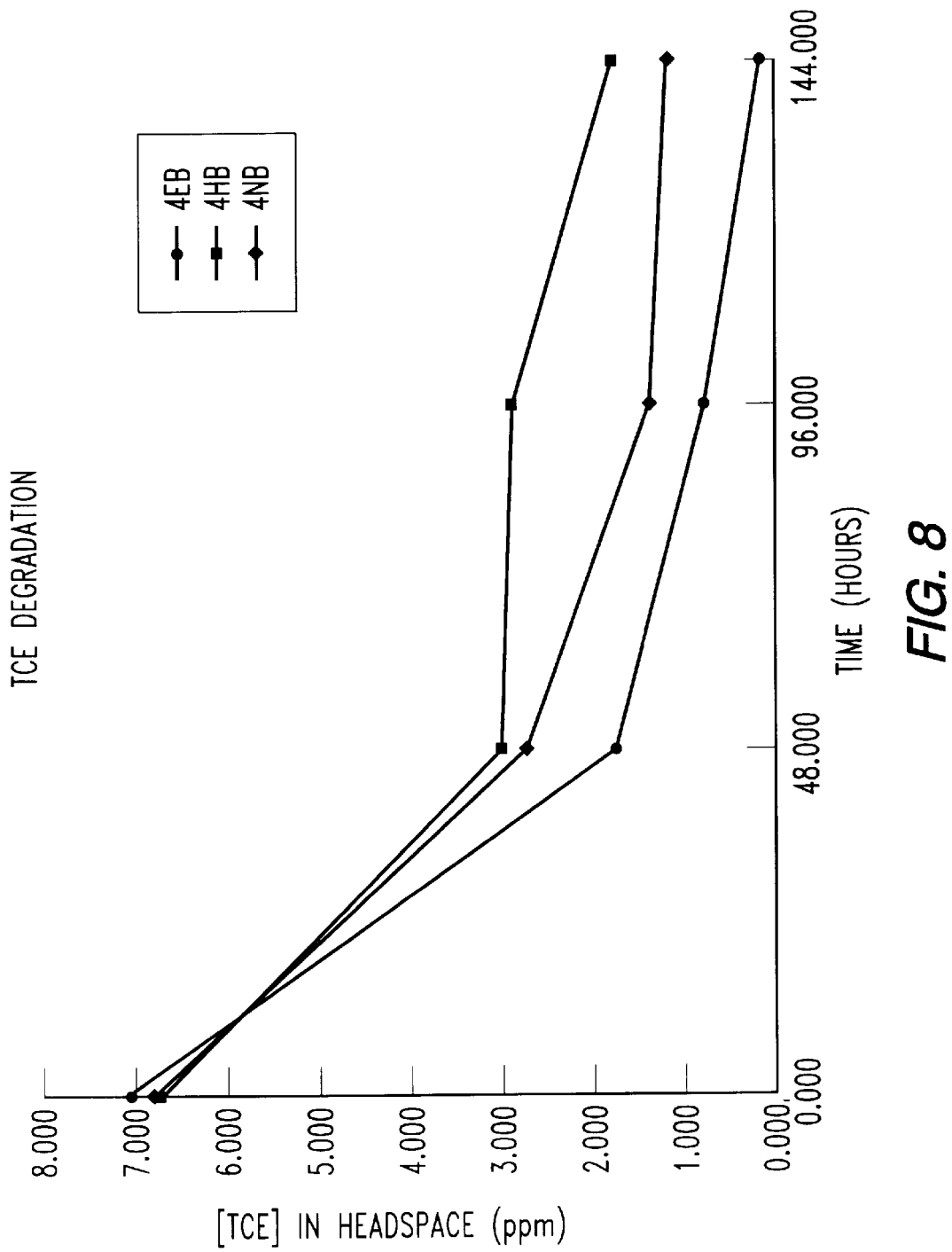

Isolates in 4EB, cell density 3.6E8, had initial $C_4H_{10}$/TCE concentrations of 670.3/7.065 ppm, respectively, and final $C_4H_{10}$/TCE concentrations of 0/0.158 ppm (see FIGS. 7 and 8). The propane-utilizing microcosm, 4EP, showed no TCE degradation. The inoculum 4EB degraded 98 percent of the total TCE added. The n-butane consumption rate (apparent zero order kinetics) for 4EB was calculated to be 4.34 mg $h^{-1}L^{-1}$, and the TCE degradation rate (first order kinetics) was 0.03 mg $h^{-1}L^{-1}$. Since the 4EB-containing microcosm showed no correlation between TCE and n-butane degradation, it is apparent that this isolate uses TCE as a carbon source.

Isolates in 4HB, cell density 4.8E8, had initial $C_4H_{10}$/TCE concentrations of 709.2/6.752 ppm, respectively, and final $C_4H_{10}$/TCE concentrations of 0/1.825 ppm (see FIGS. 7 and 8). The inoculum 4HB degraded 73 percent of the total TCE added. The n-butane consumption rate (apparent zero order kinetics) for 4HB was calculated to be 5.13 mg $h^{-1}L^{-1}$, and the TCE degradation rate (first order kinetics) was 0.01 mg $h^{-1}L^{-1}$. Since the 4HB-containing microcosm showed no correlation between TCE and n-butane degradation, it is apparent that this isolate uses TCE as a carbon source.

Isolates in 4NB, cell density 2.6E8, had initial $C_4H_{10}$/TCE concentrations of 709.2/6.752 ppm, respectively, and final $C_4H_{10}$/TCE concentrations of 0/1.825 ppm (see FIGS. 7 and 8). The propane-utilizing microcosm, 4NP, showed no TCE degradation whereas 4NB degraded 82 percent of the total TCE added. The n-butane consumption rate (apparent zero order kinetics) for 4NB was calculated to be 4.44 mg $h^{-1}L^{-1}$, and the TCE degradation rate (first order kinetics) was 0.01 mg $h^{-1}L^{-1}$. Since the 4NB-containing microcosm showed no correlation between TCE and n-butane degradation, it is apparent that this isolate uses TCE as a carbon source.

Figure 9:
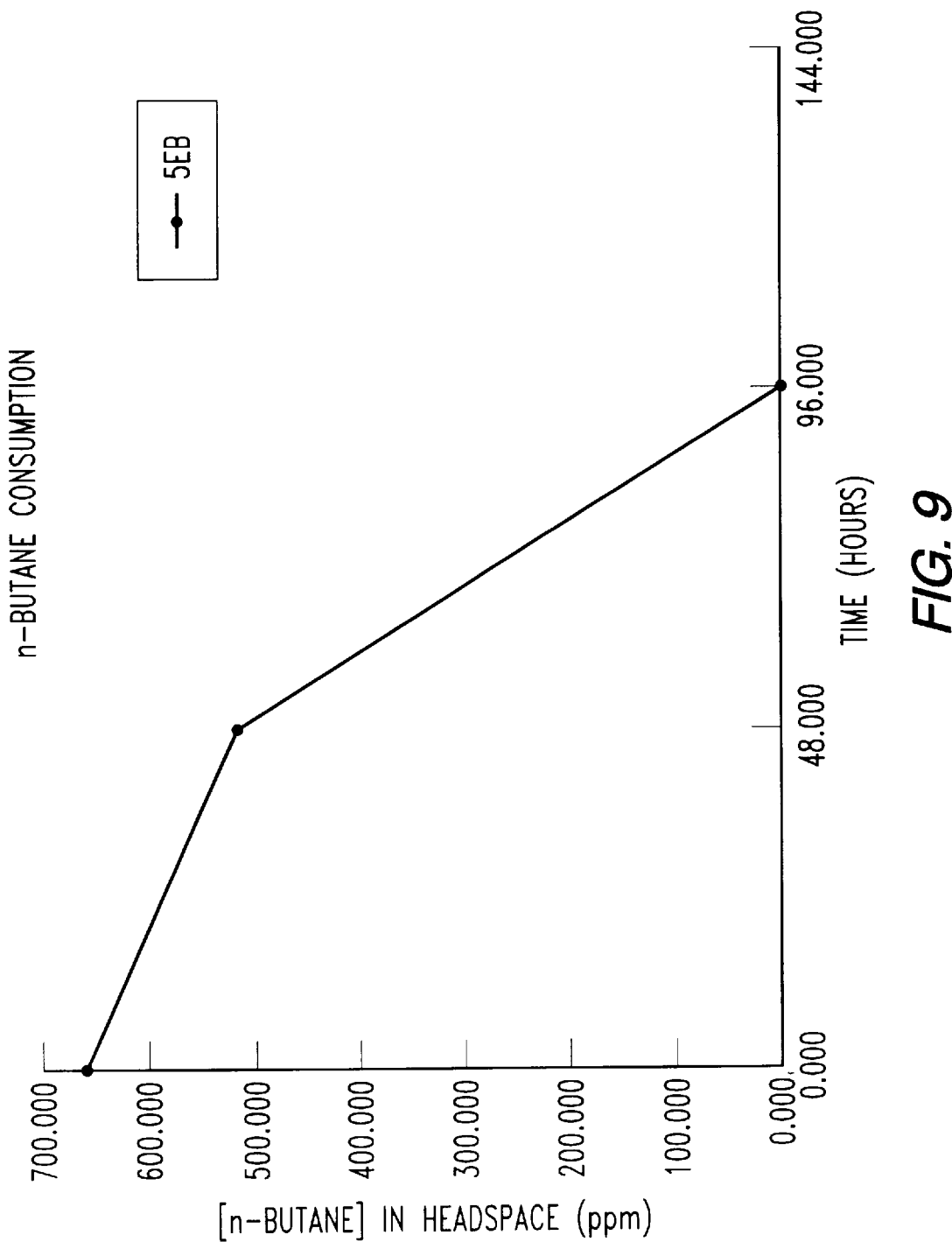
Figure 10:
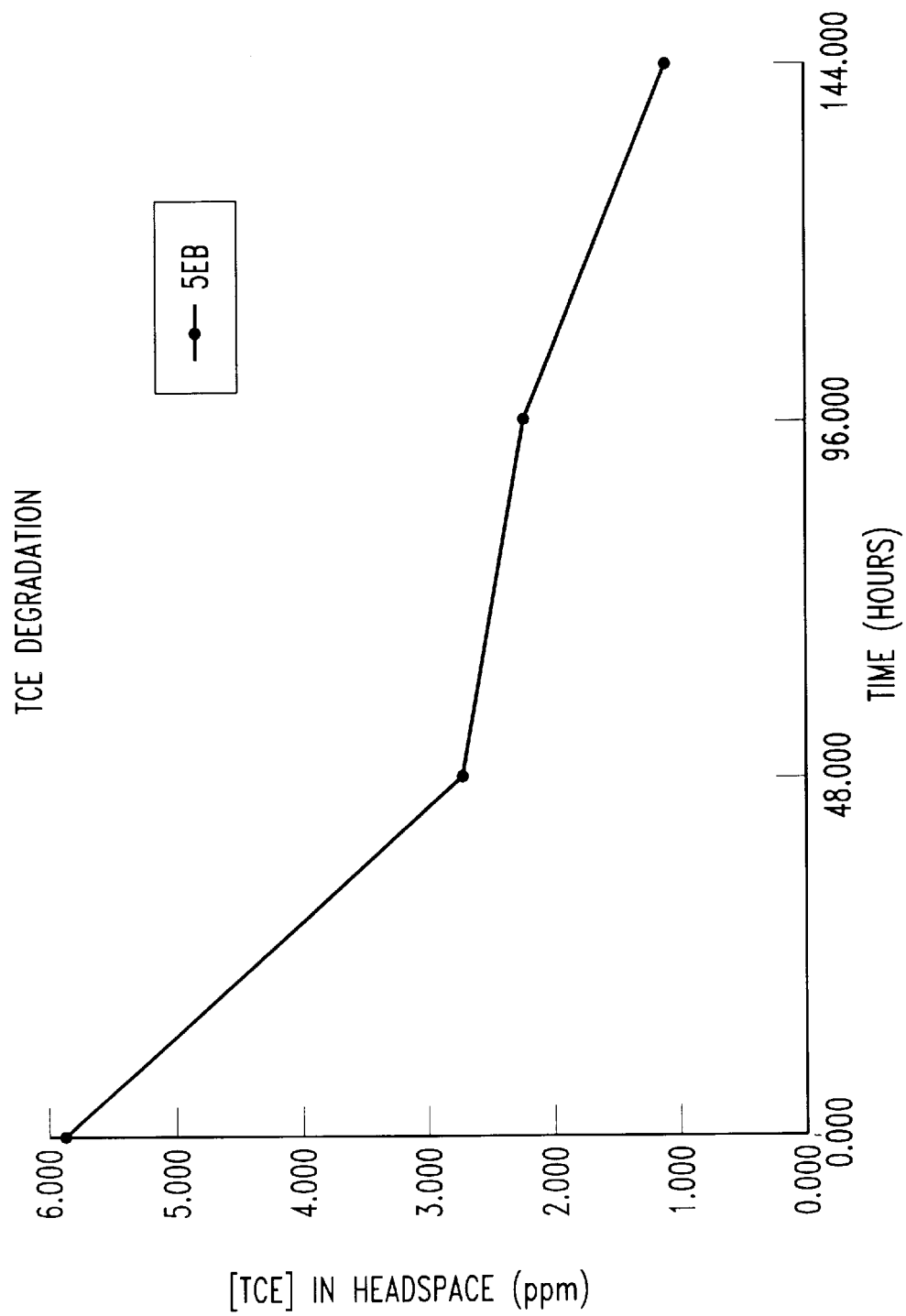

Isolates in 5EB, cell density 3.1E8, had initial $C_4H_{10}$/TCE concentrations of 659.8/5.873 ppm, respectively, and final $C_4H_{10}$/TCE concentrations of 0/1.113 ppm (see FIGS. 9 and 10). The inoculum 5EB degraded 81 percent of the total TCE added. The n-butane consumption rate (apparent zero order kinetics) for 5EB was 5.20 mg $h^{-1}L^{-1}$, and the TCE degradation rate (first order kinetics) was 0.01 mg $h^{-1}L^{-1}$. Therefore, 520 ppm of n-butane was required to degrade 1.0 ppm TCE. Since the 5EB-containing microcosm showed no correlation between TCE and n-butane degradation, it is apparent that this isolate uses TCE as a carbon source.

Figure 11:
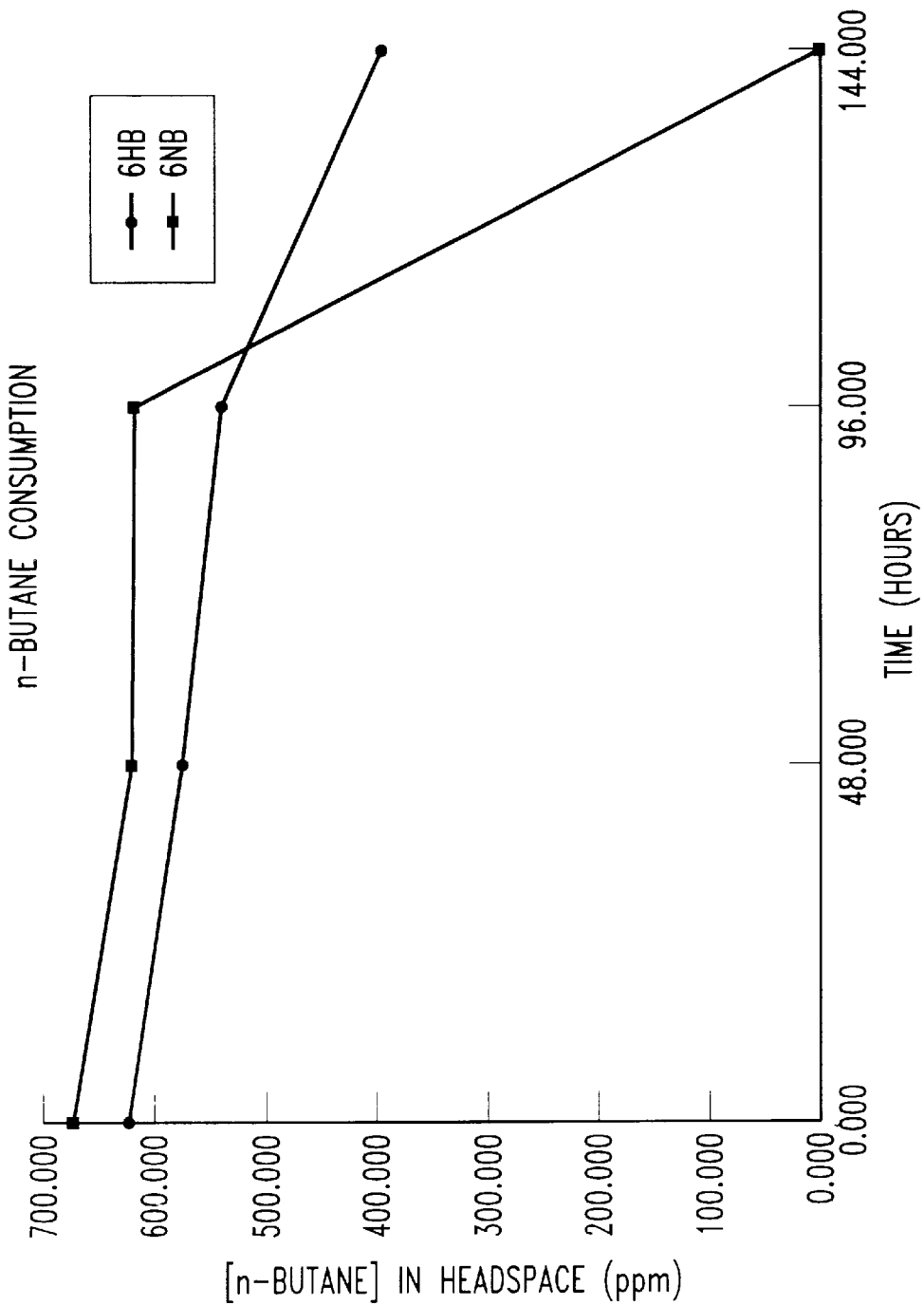
Figure 12:
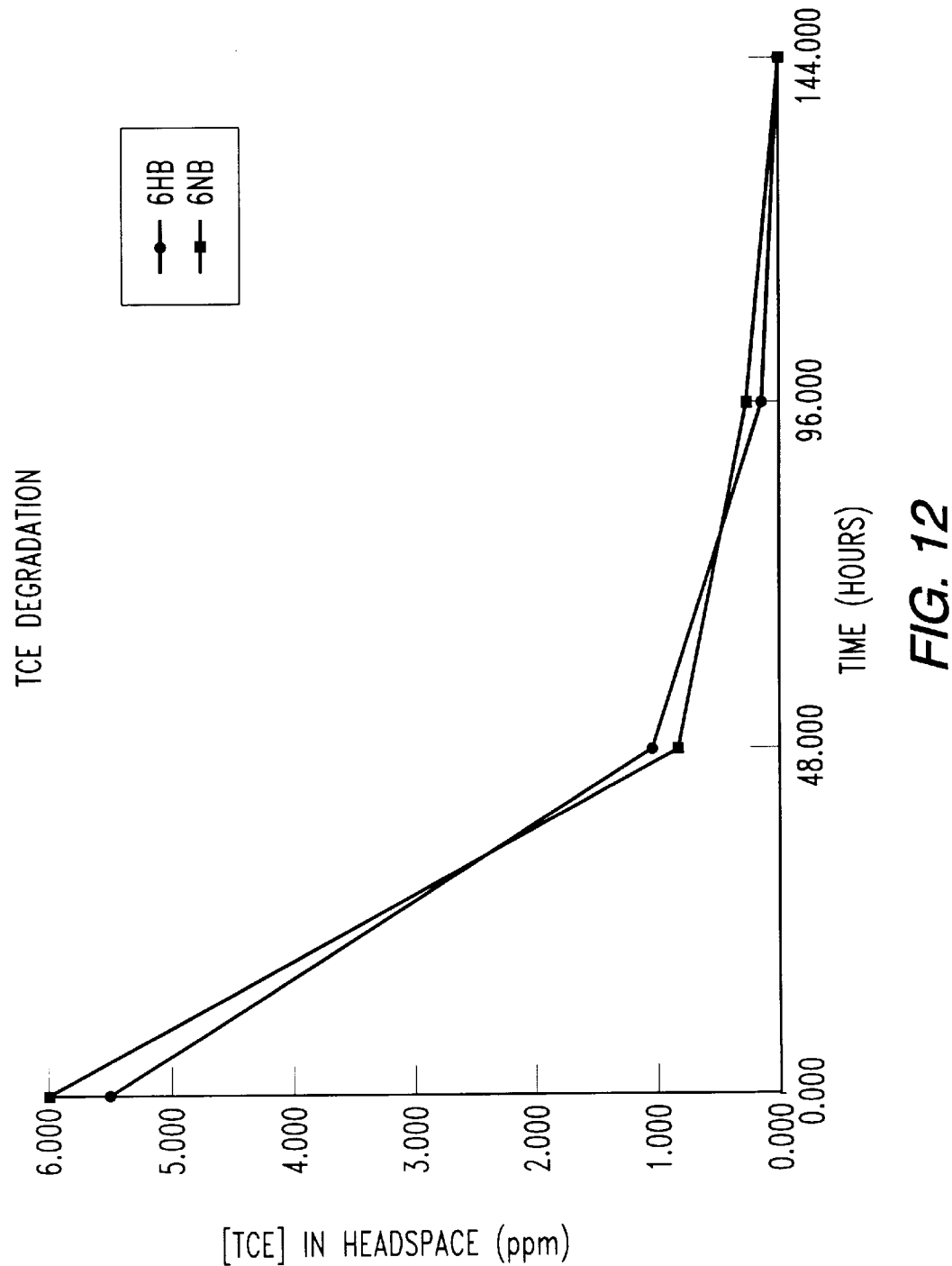

Isolates in 6HB, cell density 1.3E8, had initial $C_4H_{10}$/TCE concentrations of 625.9/5.508 ppm, respectively, and final $C_4H_{10}$/TCE concentrations of 397.4/0.0 ppm (see FIGS. 11 and 12). The inoculum 6HB degraded 100 percent of the total TCE added. The n-butane consumption rate was 1.50 mg $h^{-1}L^{-1}$, and the TCE degradation rate (zero order kinetics) was 0.04 mg $h^{-1}L^{-1}$. Therefore, 37.50 ppm of n-butane was required to degrade 1.0 ppm TCE, a very low butane requirement. These isolates may degrade TCE in the absence of butane.

Isolates in 6NB, cell density 4.8E7, had initial $C_4H_{10}$/TCE concentrations of 675.8/5.996 ppm, respectively, and final $C_4H_{10}$/TCE concentrations of 0.0/0.0 ppm (see FIGS. 11 and 12). The inoculum 6NB degraded 100 percent of the total TCE added. The n-butane consumption rate (apparent zero order kinetics) was 4.23 mg $h^{-1}L^{-1}$, and the TCE degradation rate (zero order kinetics) was 0.04 mg $h^{-1}L^{-1}$. Therefore, 106 ppm of n-butane was required to degrade 1.0 ppm TCE. The 6NB-containing microcosm showed a good correlation between TCE and n-butane consumption. Thus, degradation is apparently a cometabolic process.

Figure 13:
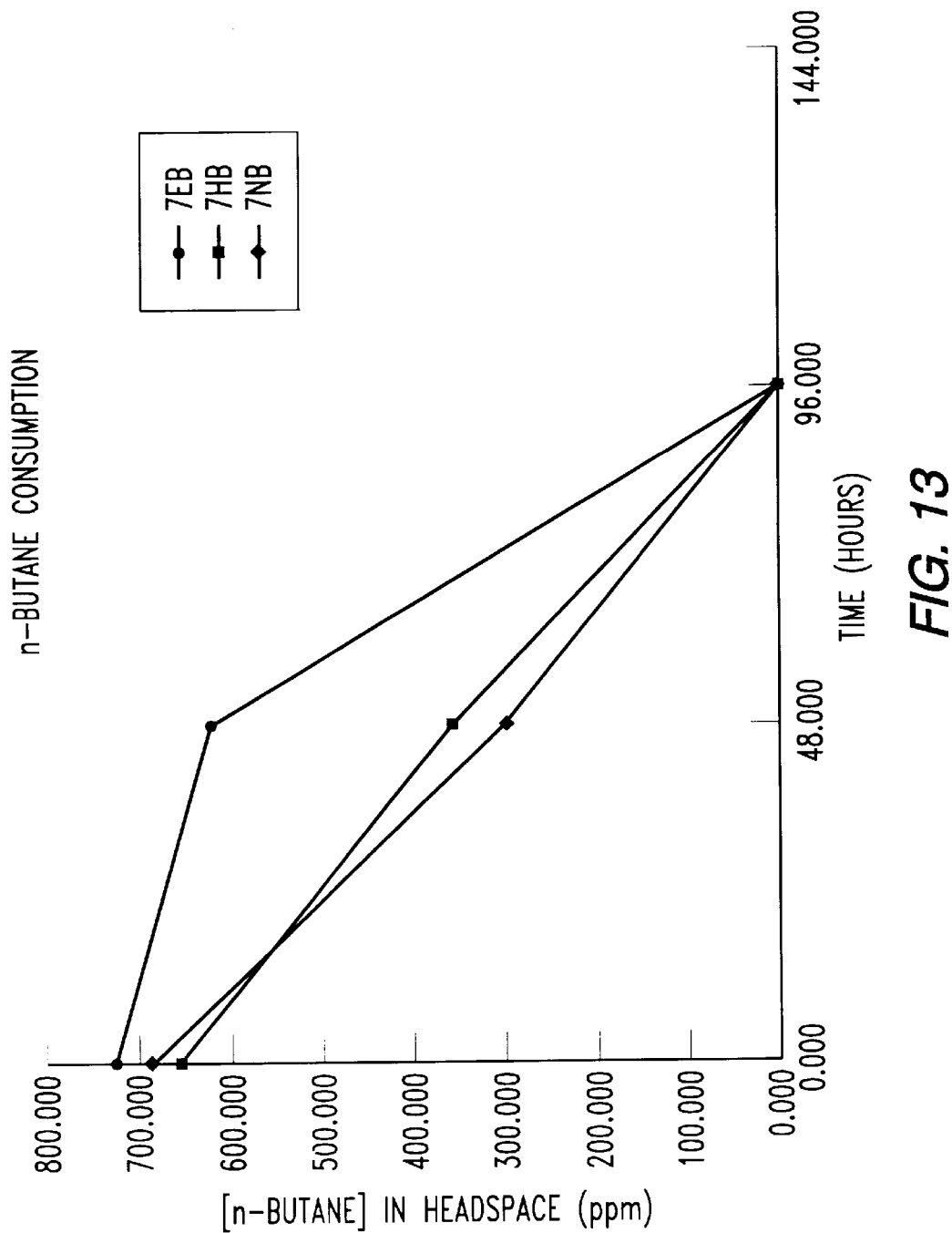
Figure 14:
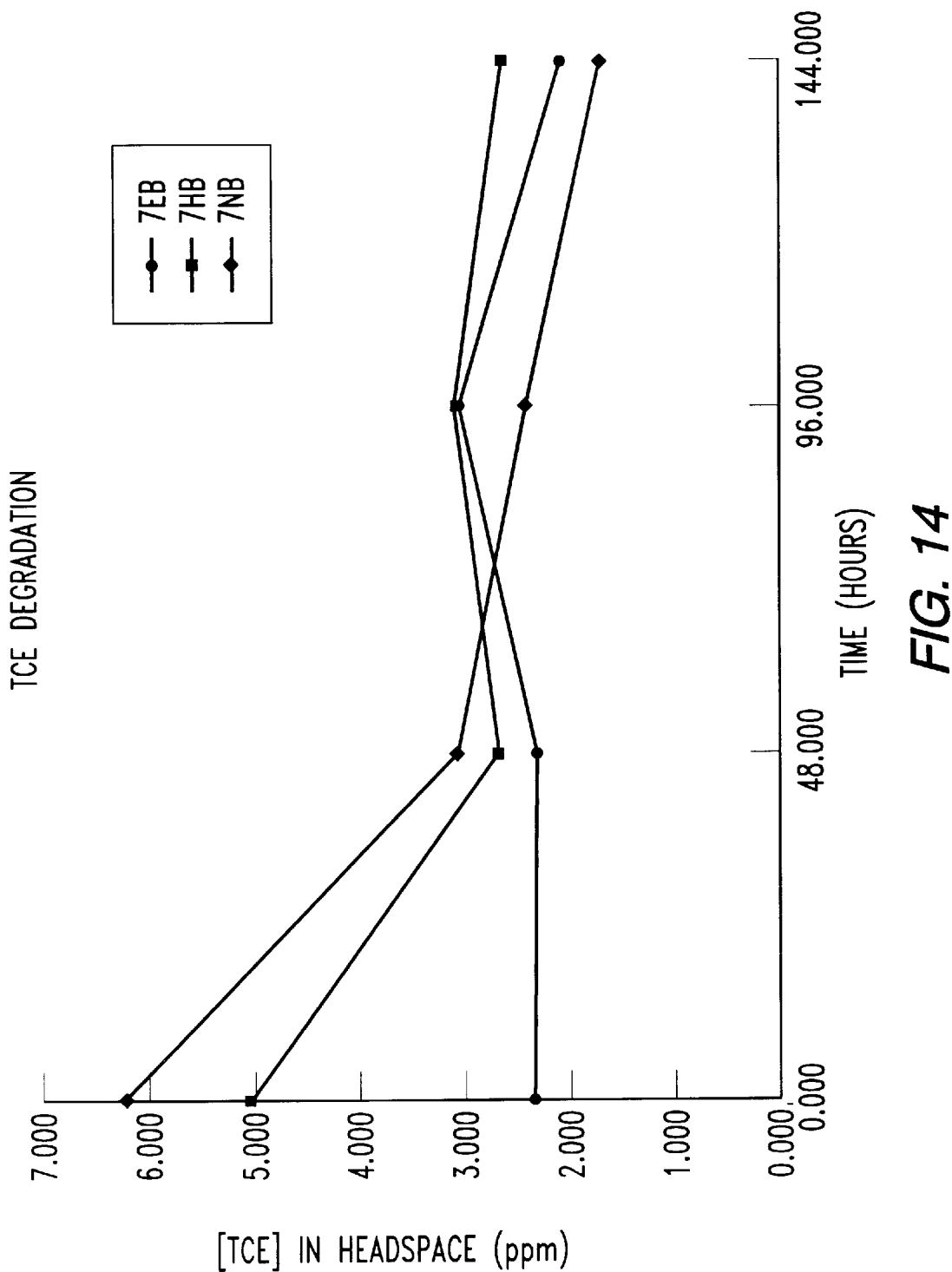
Figure 15:
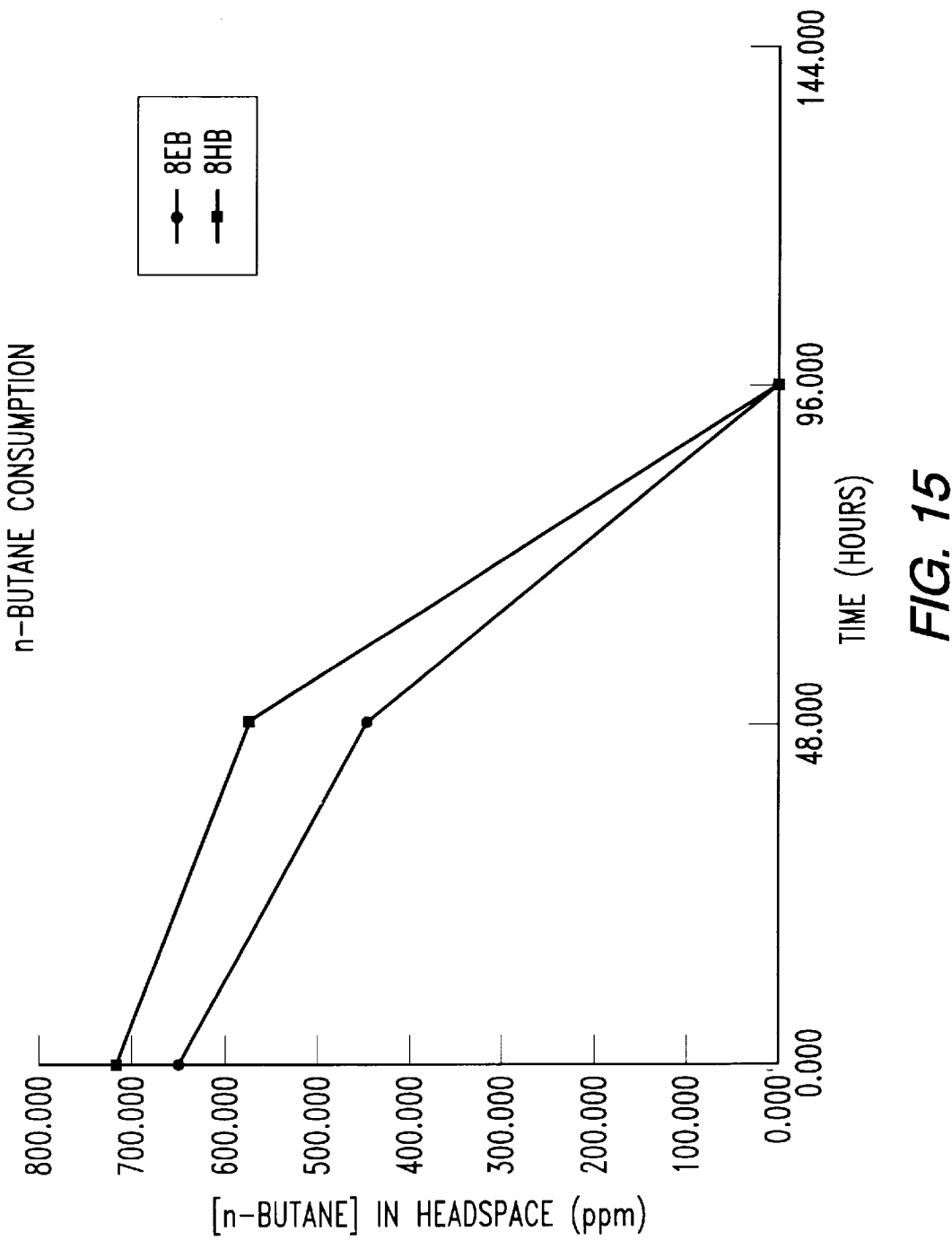
Figure 16:
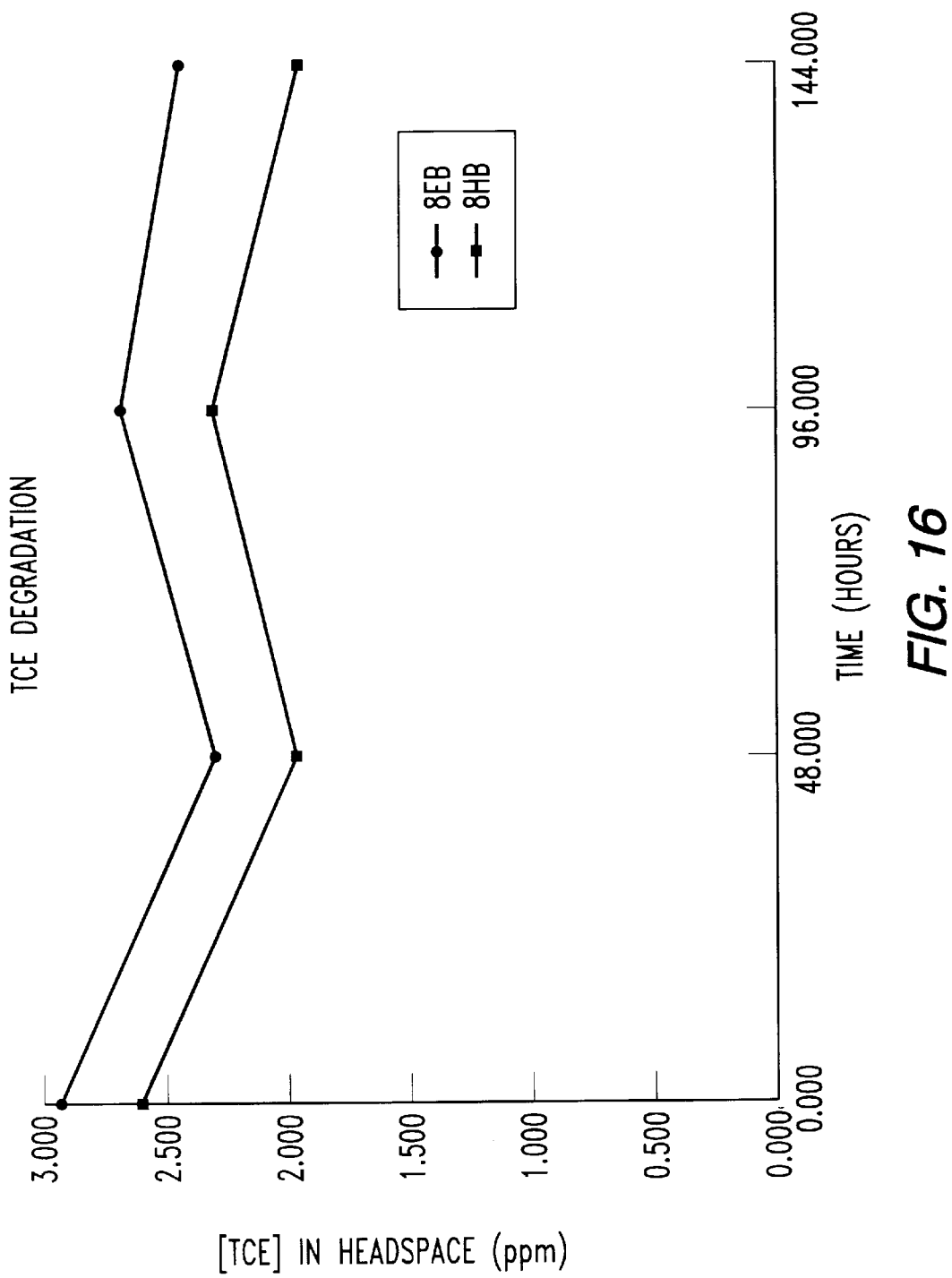

Isolates in 7EB, cell density 1.6E8, had initial $C_4H_{10}$/TCE concentrations of 726.0/2.357 ppm, respectively, and final $C_4H_{10}$/TCE concentrations of 0.0/2.100 ppm (see FIGS. 13 and 14). The inoculum 7EB degraded only 11% of the total TCE added. The n-butane consumption rate (apparent zero order kinetics) was 5.0 mg $h^{-1}L^{-1}$, and the TCE degradation rate (first order kinetics) was 0.002 mg $h^{-1}L^{-1}$.

Isolates in 7HB, cell density 3.9E8, had initial $C_4H_{10}$/TCE concentrations of 656.3/5.05 ppm, respectively, and final $C_4H_{10}$/TCE concentrations of 0.0/2.700 ppm (see FIGS. 13 and 14). The inoculum 7HP degraded 14 percent of the total TCE added, while the inoculum 7HB degraded 47% of the total TCE added. The n-butane consumption rate for 7HB (apparent zero order kinetics) was 4.6 mg $h^{-1}L^{-1}$, and the TCE degradation rate (first order kinetics) was 0.02 mg $h^{-1}L^{-1}$. The 7HB-containing microcosm showed a good correlation between TCE and n-butane consumption. Thus, degradation is apparently a cometabolic process.

Isolates in 7NB, cell density 4.2E8, had initial $C_4H_{10}$/TCE concentrations of 687.5/6.232 ppm, respectively, and final $C_4H_{10}$/TCE concentrations of 0.0/1.721 ppm (see FIGS. 13 and 14). The inoculum 7NP degraded 20 percent of the total TCE added, while the inoculum 7NB degraded 72 percent of the total TCE added. The n-butane consumption rate (apparent zero order kinetics) was 4.92 mg $h^{-1}L^{-1}$, and the TCE degradation rate (first order kinetics) was 0.01 mg $h^{-1}L^{-1}$. Since the 7NB-containing microcosm showed no correlation between TCE and n-butane degradation, it is apparent that this isolate uses TCE as a carbon source.

TCE degradation in a few microcosms was independent of butane consumption. For example, the isolates in 4NB and 7NB degraded TCE continuously in the absence of butane. Other microcosms such as 4EB demonstrate cometabolic degradation of TCE with butane.

From the above-noted results, it appears that TCE toxicity for the butane-utilizing bacteria is minimal. The butane-utilizing bacteria are preferably capable of surviving TCE levels above about 6 mg/l, more preferably above about 10 mg/l, and most preferably above about 20 mg/l aqueous phase. As set forth in U.S. Pat. No. 4,713,343 to Wilson Jr. et al., cited previously, the growth of methane-utilizing bacteria are inhibited by the presence of a chlorinated epoxide that forms during the cometabolic degradation of TCE mediated by the enzyme methane monooxygenase. According to Broholm et al., 1990, cited previously, TCE is toxic to methane-utilizing bacteria at concentrations above 6 mg/l in water. A quantitative comparison of TCE toxicity between methane-, propane- and butane-utilizing bacteria showed that the butane-utilizing bacteria of the present invention were substantially less susceptible to the effects of TCE toxicity. Butane-utilizing bacteria survived at an average of 1.4 times higher concentrations of TCE than propane oxidizers. Moreover, the butane-utilizing bacteria are capable of surviving at several orders of magnitude higher TCE concentrations than methane oxidizers.

In accordance with a preferred embodiment of the present invention, TCE is degraded at higher rates with butane-utilizing bacteria in comparison with methane- or propane-utilizing bacteria. Over 50% of the butane-utilizing bacteria degraded TCE to half of its initial concentration within 48 hours after incubation. This high rate of degradation was not observed in over 80 percent of the microcosms containing methane- or propane-utilizing bacteria. The butane-utilizing bacteria of the present invention are preferably capable of degrading TCE at a rate of greater than about 1 mg/hr/liter in water, more preferably at a rate of greater than about 1.5 or 2 mg/hr/liter. As discussed more fully below, processing parameters may be controlled during the bioremediation process to achieve high TCE degradation rates of 10 to 20 mg/hr/liter or higher.

As a food source for microbial consumption, butane has been found to be a superior substrate to methane or propane due to plus solubility factor. Methane and propane are characterized as slightly soluble in water while butane is characterized as very soluble in water. At 17 degrees centigrade, 3.5 ml of methane and 6.5 ml of propane dissolves in 100 ml of water. In contrast, 15 ml of butane dissolves in 100 ml of water. Higher solubility increases microbial access to the growth substrate for metabolism, and may produce reaction rates demonstrating zero order kinetics. Another cause of the higher TCE cometabolic rates for the butane-utilizers in comparison with the methane- or propane-utilizers may be the molecular structure of the compounds and enzymes. TCE is a large planar molecule composed of two carbon atoms and three chlorine atoms. Methane is a small single tetrahedral carbon molecule, while propane is a three carbon molecule. On the other hand, butane is a large non-planar four carbon molecule. While not intending to be bound by any particular theory, molecular structure, reactive surface area and size may play a role in causing the operative enzymes of the butane oxidizers to be superior TCE degraders in comparison with the methane and propane operative enzymes. The occurrence of TCE degradation in absence of any other growth substrate clearly provides highly improved TCE degradation capability. Furthermore, while methane-utilizing bacteria are typically sensitive to normal oxygen tension of an air atmosphere and require decreased oxygen levels for growth, the butane-utilizing bacteria of the present invention are not sensitive to ambient oxygen tension and can be used with normal atmospheres. In addition, the butane-utilizers do not exhibit copper toxicity, and do not require carbon dioxide as a supplementary carbon source.

Various propane-utilizing and butane-utilizing bacteria were characterized as follows. Microorganism identification is based on the Similarity Index. The Similarity Index in the Microbial Identification System (MIS) is a numerical value which expresses how closely the fatty acid composition of an unknown sample compares with the mean fatty acid methyl ester composition of the strains used to create the library entry listed as its match. The database search presents the best matches and associated similarity indices. An exact match of the fatty acid make-up of the unknown sample to the mean of a library entry results in a similarity index of 1.000. The similarity index will decrease as each fatty acid varies from the mean percentage. Strains with a similarity of 0.500 or higher and with a separation of 0.100 between first and second choice are good matches (good or excellent). A similarity index between 0.300 and 0.500 may be a good match but would indicate an atypical strain (OK). Values lower than 0.300 suggest that the species is not in the database but those listed provide the most closely related species (weak or poor).

In the cases where a strain remained unidentified after fatty acid analysis, the Biolog system was employed where microorganisms are identified by comparing substrate utilization characteristics of the unknown isolate to the Biolog database.

The following isolates were chosen for identification at two independent laboratories: propane-utilizers 2EP, 3EP, 4HP, 6HP, 6NP and 8NP; and butane-utilizers 2EB, 2HB, 3EB, 3NB, 4EB, 4HB, 4NB, 5EB, 6HB, 6NB and 7NB.

The majority of the propane-utilizers and butane-utilizers were characterized as different genera/species by both laboratories for the comparison-pair isolates 2EP-2EB, 3EP-3EB, 4HP-4HB, 6HP-6HB, and 6NP-6NB, thus indicating that the butane-utilizers are a distinct class of microorganism from the propane degraders. Since methane-utilizing bacteria are obligate methane oxidizers, no isolates from the methane microcosms were submitted for laboratory analysis. Most isolates from the microcosms were mixed. Between both laboratories, 59 genus/specie were identified with "good or excellent" precision, 14 with "OK" precision (atypical strains) and 22 with "weak" precision (species not in database and remain as unknowns). A summary of the butane-utilizers that have demonstrated the ability to degrade TCE are identified in Table 14.

TABLE 14

| Sample ID | Genus | Species |
| --- | --- | --- |
| 2HB* | Pseudomonos | putida |
| 2EB | Pseudomonos | rubrisubalbicans |
| 3EB | Pseudomonos | rubrisubalbicans |

TABLE 14-continued

| Sample ID | Genus | Species |
|---|---|---|
| 5EB | Pseudomonos | aeruginosa |
| 6NB | Pseudomonas | aeruginosa |
| 2EB | Variovorax | paradoxus |
| 2HB | Variovorax | paradoxus |
| 3EB | Variovorax | paradoxus |
| 3NB | Variovorax | paradoxus |
| 4HB | Variovorax | paradoxus |
| 4NB | Variovorax | paradoxus |
| 5EB* | Variovorax | paradoxus |
| 6HB | Variovorax | paradoxus |
| 2EB | Variovorax | paradoxus** |
| 6NB | Variovorax | paradoxus*** |
| 7NB | Nocardia | asteroides |
| 2HB | Nocardia | asteroides*** |
| 3EB | Nocardia | asteroides*** |
| 4HB* | Nocardia | asteroides*** |
| 4NB | Nocardia | asteroides*** |
| 7NB | Nocardia | asteroides*** |
| 5EB* | Nocardia | brasiliensis |
| 2EB | Nocardia | restricta |
| 2HB | Nocardia | globerula |
| 2HB | Chryseobacterium | indologenes |
| 4HB | Chryseobacterium | indologenes |
| 7NB | Chryseobacterium | indologenes |
| 5EB | Chryseobacterium | meningosepticum |
| 2EB | Comamonas | acidovorans |
| 3NB | Comamonas | acidovorans |
| 6HB | Comamomas | acidovorans |
| 6NB | Comamonas | acidovorans |
| 4EB | Acidovorax | delafieldii |
| 4NB | Acidovorax | delafieldii |
| 6NB | Acidovorax | delafieldii |
| 4NB | Rhodococcus | rhodochrous |
| 7NB | Rhodococcus | rhodochrous |
| 2EB | Rhodococcus | erythropolis |
| 3EB | Rhodococcus | erythropolis |
| 6HB | Rhodococcus | erythropolis |
| 4EB* | Rhodococcus | fascians |
| 5EB* | Rhodococcus | fascians |
| 4NB | Aureobacterium | barkeri |
| 4HB | Aureobacterium | esteroaromaticum |
| 4NB | Aureobacterium | esteroaromaticum |
| 6HB | Aureobacterium | saperdae |
| 5EB | Micrococcus | varians |
| 7NB | Micrococcus | varians |
| 7NB | Micrococcus | kristinae |
| 6HB | Aeromonas | caviae |
| 6NB | Aeromonas | caviae |
| 2EB | Stenotrophomonas | maltophilia |
| 3EB | Stenotrophomonas | maltophilia |
| 4EB | Stenotrophomonas | maltophilia |
| 5EB | Stenotrophomonas | maltophilia |
| 6HB | Stenotrophomonas | maltophilia |
| 6NB | Stenotrophomonas | maltophilia |
| 4EB | Sphingobacterium | thalpophilum |
| 4NB* | Sphingobacterium | spiritivorum |
| 4NB | Shewanella | purefaciens B |
| 3NB* | Phyllobacterium | myrsinacearum |
| 6HB | Clavibacter | michiganense |
| 6HB | Clavibacter | michiganense**** |
| 6NB | Alcaligenes | xylosoxydans |
| 7HB* | Gordona | terrae |
| 7NB | Corynebacterium | aquaticum B |
| 7NB | Cytophaga | johnsonae |

*low similarity index indicating a poor match with the fatty-acid database. In these cases, the species in the consortia listed was matched to a database testing substrate utilization and remained unidentified. The (*) best describes an unknown genera/species.
**GC Subgroup A subspecies
***GC Subgroup B subspecies
****tessellarius subspecies In accordance with the present invention, butane-utilizing bacteria have been found to withstand TCE concentrations that have proven fatal to methanotrophic bacteria. The butane-utilizing bacteria also demonstrate higher TCE degradation than propane-utilizing bacteria. In addition, analysis of TCE degradation by selected isolates indicates that certain butane-utilizing bacteria use TCE as a carbon source.

In-situ bioremedial processes that may be used in accordance with the present invention include the injection of non-indigenous butane-utilizing microorganisms into the surface or subsurface and/or the use of indigenous butane-utilizing microorganisms. Indigenous microorganisms can be stimulated to flourish by the addition of nutrients and a growth substrate that may be limited in the ecosystem under scrutiny. For aerobic metabolism, oxygen is usually in limited concentrations. The growth of butane-utilizing bacteria may be enhanced through the addition of oxygen, nutrients and butane in any subsurface environment in which chlorohydrocarbons have been introduced, thereby creating an effective treatment zone. Oxygen, nutrients such as inorganic and organic nitrogen-containing compounds and butane gas can be delivered into the subsurface through injection or diffusion wells or some other type of delivery system. Alternatively, non-indigenous strains of butane-utilizing organisms may be injected into a subsurface environment. For TCE-utilizing bacteria, the introduction of the aliphatic hydrocarbon carbon source may not be necessary. The butane-utilizing organisms of the present invention may be applied in-situ. in saline or low pH environments as well.

Furthermore, butane-utilizing organisms of the present invention may be provided in an ex-situ bioreactor capable of treating air, soil or groundwater (freshwater, saline or low pH) waste streams. The ex-situ bioreactor may be used in a batch-type process and/or in a continuous flow process.

For air or gas treatment, butane-utilizing bacteria may be grown in a bioreactor on any suitable type of packing material or substrate capable of withstanding turbulent gas streams. The gas stream laden with chlorinated volatile organic compounds may be extracted from the subsurface or other environment with a vacuum blower and treated in a bioreactor. In this embodiment, treatment consists of passing the chlorinated air waste stream through the bioreactor in much the same fashion as conventional activated carbon systems, with the exception that the contaminants are not merely transferred but destroyed.

Chlorohydrocarbon-impacted soils may be bioremediated in accordance with the present invention with butane-utilizing organisms in an ex-situ bioreactor. This apparatus may agitate soil through mixing or fluidizing, thereby accelerating the volatilization of chlorohydrocarbons which could be treated as an air waste stream described above. Another type of soil reactor may degrade chlorohydrocarbons in a bioreactor capable of treating a soil slurry matrix through either the introduction of non-indigenous butane-utilizing bacteria, or the stimulation of indigenous butane-utilizing bacteria. Oxygen, nutrients including alternate limited carbon and nitrogen sources such as casamino acids and yeast and butane may be introduced into this type of bioreactor. The use of surfactants may accelerate the removal of the chlorinated compounds from the soil matrix thereby lower treatment time and increasing bioreactor performance.

In accordance with an embodiment of the present invention, an ex-situ bioreactor may be used to restore surface water or groundwater impacted with chlorohydrocarbons such as TCE, by employing butane-utilizing bacteria. The impacted water may comprise fresh water, salt water, low pH water or the like. The ex-situ bioreactor may comprise one or multiple chambers, each housing a substrate such as biofilm fabric or packing material seeded with specific strains or a consortia of butane-utilizing bacteria. Each bioreactor chamber preferably comprises an oxygen, nutrient and butane gas delivery system. Bioreactor systems employing butane-utilizing organisms that demonstrate the ability to use TCE as a direct food source may not require the introduction of butane. However, in a cometabolic system, timers are preferably included to regulate the introduction of the butane, thereby reducing the likelihood of saturating the enzyme sites which would result in a lower contaminant destruction rate.

Figure 17:
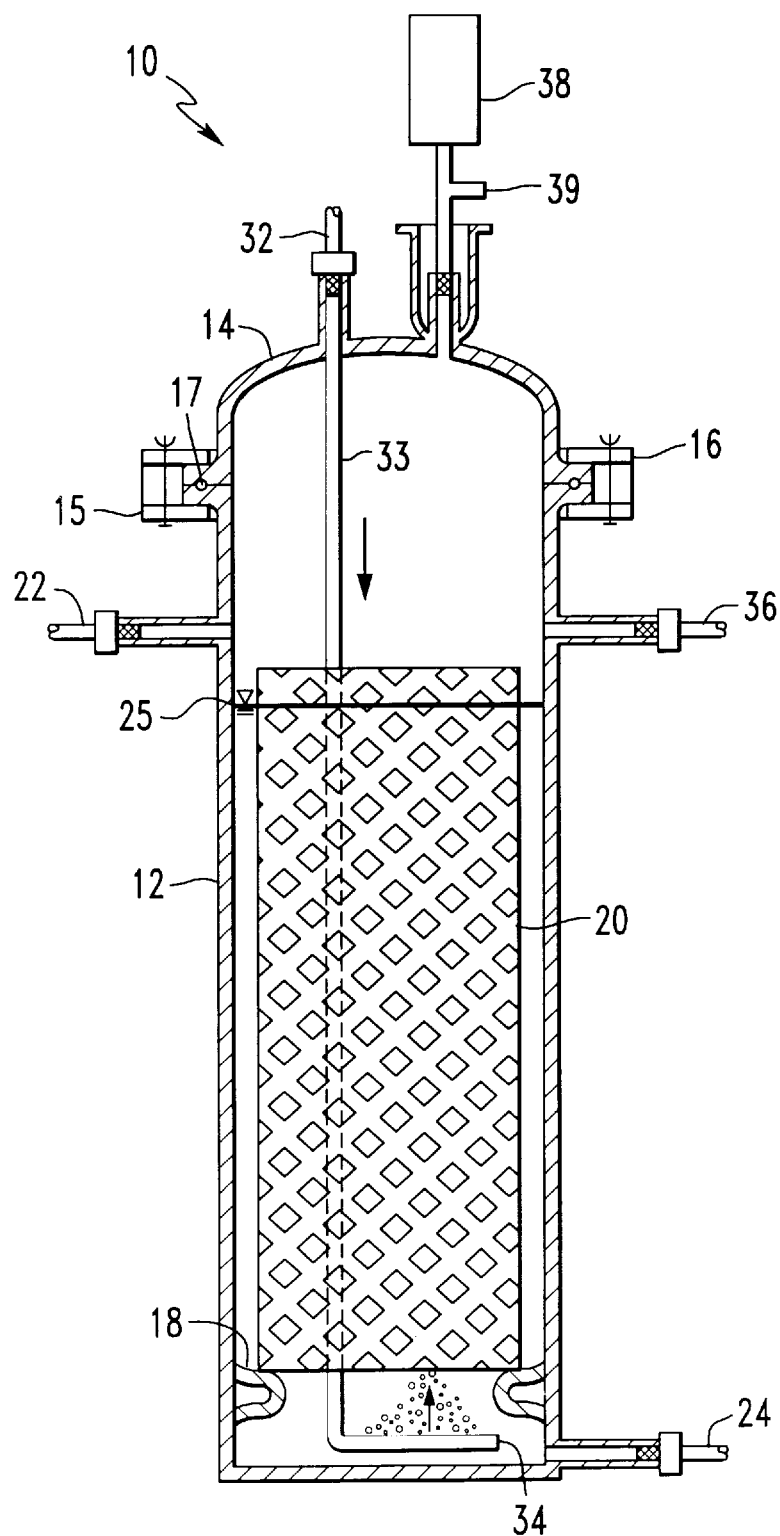
FIG. 17 is a partially schematic illustration of a bioreactor for use with butane-utilizing bacteria in accordance with the present invention.

FIG. 17 illustrates an ex-situ bioreactor for use in accordance with an embodiment of the present invention. The bioreactor 10 includes a generally cylindrical container 12 having a cap 14. The cap 14 is sealed to the container 12 by clamps 15 and 16, along with an O-ring gasket 17. A support member 18 secures a microorganism substrate 20 at the desired position within the container 12.

The substrate 20 may comprise any suitable material such as a bioscreen made of aluminum, steel, stainless steel or any substantially non-reactive, non-absorbent support material, preferably coated with trichlorofluoroethylene or other suitable coating for growth/colonization of bacterial cells through biofilm formation. In a preferred embodiment, the substrate 20 comprises a bioscreen made of aluminum screen with pore size 0.0039 square inch, rolled in concentric circles to increase available surface area for biofilm formation.

A fluid inlet 22 communicates with the interior of the bioreactor 10. In accordance with the present invention, the term "fluid" includes flowable materials such as liquids, gases, slurries, fluidized solids and the like. A fluid outlet 24 communicates with the interior of the bioreactor 10 to transport fluid therefrom. During operation, the fluid fills the bioreactor 10 to the desired level 25.

As shown in FIG. 17, a gas inlet 32 passes through the bioreactor cap 14. A tube 33 connects with a sparger 34 to deliver the gas to the interior of the bioreactor 10. A gas outlet 39 allows gas to exit the bioreactor. A pressure relief valve 38 prevents excessive buildup of pressure within the bioreactor, while a gas sampling port 36 allows for testing of headspace gas within the bioreactor.

Figure 18:
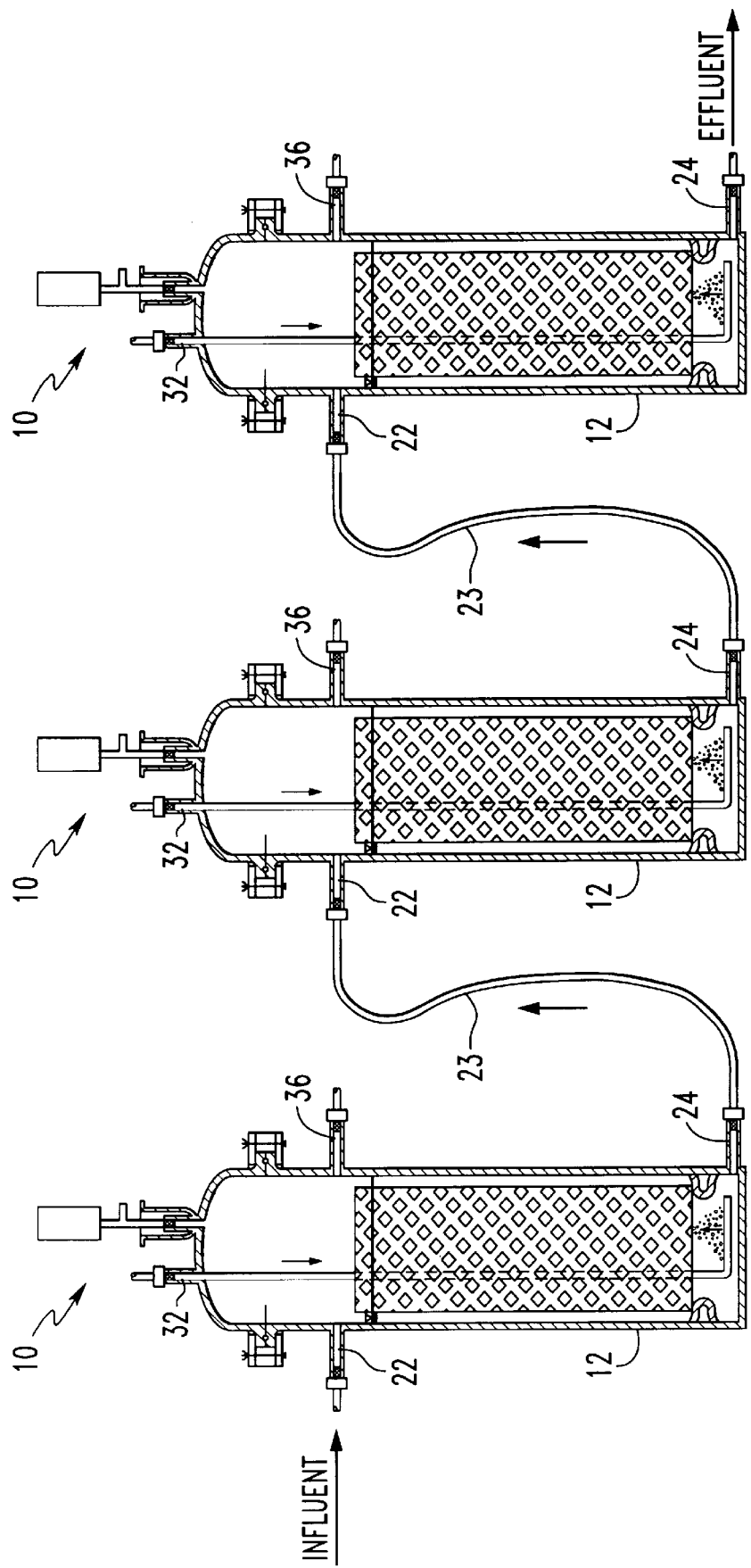
FIG. 18 is a partially schematic illustration of multiple bioreactors connected in series using butane-utilizing bacteria in accordance with the present invention.

Single or multiple bioreactor chambers may be used in accordance with the present invention. For example, as shown in FIG. 18, multiple bioreactors 10 may be connected in series. In FIG. 18, influent enters the leftmost bioreactor 10 via the fluid inlet 22. After treatment in the first bioreactor, fluid travels to the middle bioreactor by a connecting tube 23. Similarly, after treatment in middle bioreactor, fluid travels to the rightward bioreactor by a connecting tube 23. After treatment in the multiple bioreactors, the effluent exists the system.

In accordance with a preferred embodiment of the present invention, the ex-situ bioreactor is provided as a portable unit that can easily be transported to various bioremediation sites. For example, single or multiple chamber bioreactors are preferably transportable by truck or other suitable means, and may be small enough to permit hand carrying. The bioreactor may be placed adjacent to a surface or subsurface water contamination site. Alternatively, for surface water bioremediation, the bioreactor may be constructed to float on or in the contaminated water.

The following examples illustrate the batch-type operation of a bioreactor similar to that shown in FIG. 17.

EXAMPLE 1

A biofilm was formed on an aluminum screen substrate 20 as shown in FIG. 17. Growth was established by operating the bioreactor shown in FIG. 17 as a growth chamber in which butane and oxygen were provided by injection into the bioreactor headspace through port 36. Butane concentrations were kept low after biofilm formation in order to limit competitive inhibition during operation of the bioreactor. One 6-liter batch bioreactor was used for the TCE cometabolic degradation test run. The bioreactor contained 4.2 liters of autoclaved deionized water with a MSM amendment and an aluminum screen with pore size 0.0039 square inches. The isolates in Sample ID 3NB were chosen to seed the bioscreen. The bioreactor headspace consisted of 2-liters of volume within the reactor and a maximum of 3-liters total headspace throughout the gas recirculation lines. The recirculation system was driven by a hermetically-sealed bellows vacuum pump that operated at 0.22 cfm and 10 psi, producing 622 ml/min of air flow. The pump was scheduled to run 30 minutes every 4 hours to produce a pulsing effect within the bioreactor between the two phases (liquid and gaseous). At the time of circulation, both TCE and butane concentrations were increased within the aqueous phase, thereby increasing the bioavailability of both compounds. At the time the pump was off, TCE volatilization and butane evolution increased in the headspace concentrations. Once the initial parameters, i.e., dissolved oxygen concentration, pH, chloride ion concentration, temperature and pressure were established using Chemetrics Titration kits and handheld meters, headspace samples were collected using gas tight syringes at a sampling port to determine the butane and TCE concentrations using a Photovac IOS Plus gas chromatograph. The parameters are set forth in Table 15.

TABLE 15

| Parameters | Initial Concentrations at 14:28 hrs. | Final Concentrations at 23:30 hrs. |
| --- | --- | --- |
| Dissolved Oxygen | 8 ppm | 7 ppm |
| pH | 7.0 | 6.5 |
| Chloride Ions | 300 ppm* | 300 ppm* |
| Temperature | 25 degrees C. | 25 degrees C. |
| Log (Cell Counts) | 12 | N/A |
| Pressure | 0 psi | 0 psi |

* = differentiation from the initial concentration of the chloride ions in the solution was not detected due to low sensitivity of the titration kit.

Figure 19:
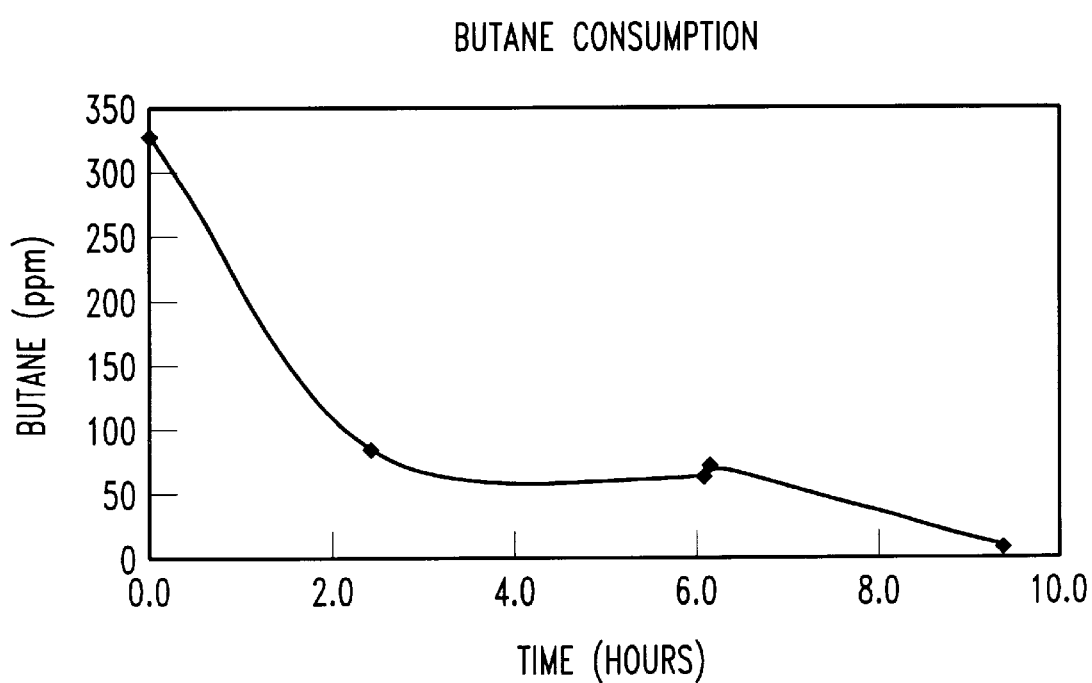
FIG. 19 is a graph showing butane consumption versus time during operation of a bioreactor in accordance with the present invention.
Figure 20:
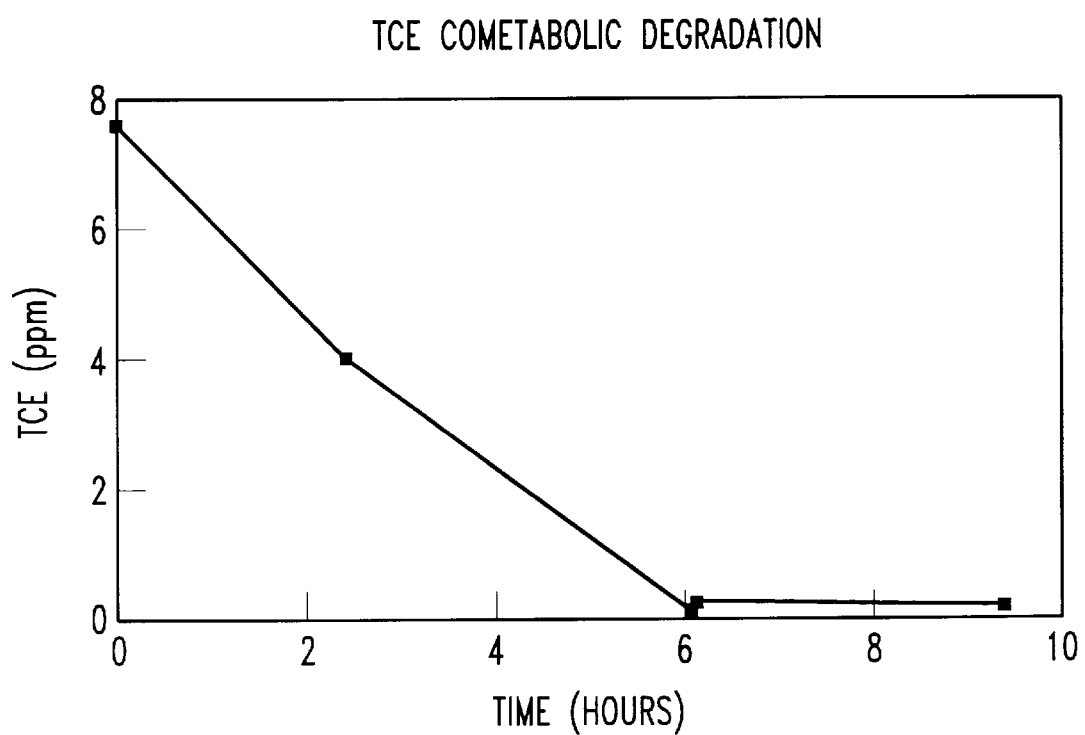
FIG. 20 is a graph showing TCE degradation versus time during operation of a bioreactor in accordance with the present invention.

FIGS. 19 and 20 demonstrate the degradation of TCE and butane in the bioreactor of FIG. 17 while it was running in batch mode. Butane was provided 24 hours prior to the introduction of TCE. TCE disappearance from its initial concentration, exceedingly higher than its toxic concentration to methanotrophs and propane oxidizers, was measured utilizing headspace analysis. The TCE was degraded at a rate of about 1.6 mg/hr/liter. The recorded concentration in headspace is half of its dissolved concentration as described by Henry's constant. Therefore, the data indicates that the butane oxidizing bacteria within this bioreactor survives at a TCE concentration of 13 mg/l, in comparison with the TCE toxic level for methanotrophs reported at concentrations above 6 mg/l by Broholm et al., 1990.

EXAMPLE 2

Two 6-liter bioreactors were operated simultaneously for six and a half hours. The first bioreactor was seeded with isolates from 3NB and the second bioreactor with isolates from 4EB. A biofilm was formed on an aluminum screen substrate as shown in FIG. 17. Each bioreactor contained 4.2 liters of autoclaved deionized water with a MSM amendment and an aluminum screen with pore size 0.0039 square inches. The two bioreactors contained 4-liters of headspace total volume and a maximum of 6-liters total headspace throughout the gas recirculation lines. The recirculation system was driven by a hermetically-sealed bellows vacuum pump that operated at 0.22 cfm and 10 psi, producing 622 ml/min of air flow. The pump simultaneously recirculated the headspace volumes in both bioreactors. The butane and TCE loss over time is shown in Table 16.

TABLE 16

| Time | Butane (ppm) | TCE (ppm) |
| --- | --- | --- |
| 0 hours | 371.9 | 11.01 |
| 1.0 hours | 387.7 | 8.471 |
| 1.2 hours | 209.5 | 4.878 |
| 2.0 hours | 205.1 | 3.974 |
| 2.2 hours | 121.7 | 3.731 |
| 3.0 hours* | 127.6 | 3.028 |
| 3.2 hours | 74.98 | 2.593 |
| 4.8 hours | 82.92 | 2.580 |
| 5.0 hours | 49.45 | 2.173 |
| 5.8 hours | 58.76 | 2.432 |
| 6.1 hours** | 42.58 | 1.875 |
| 6.7 hours | 38.93 | 1.273 |

*80 ml of oxygen added to system
**pump ran continuously for 30 minutes

Figure 21:
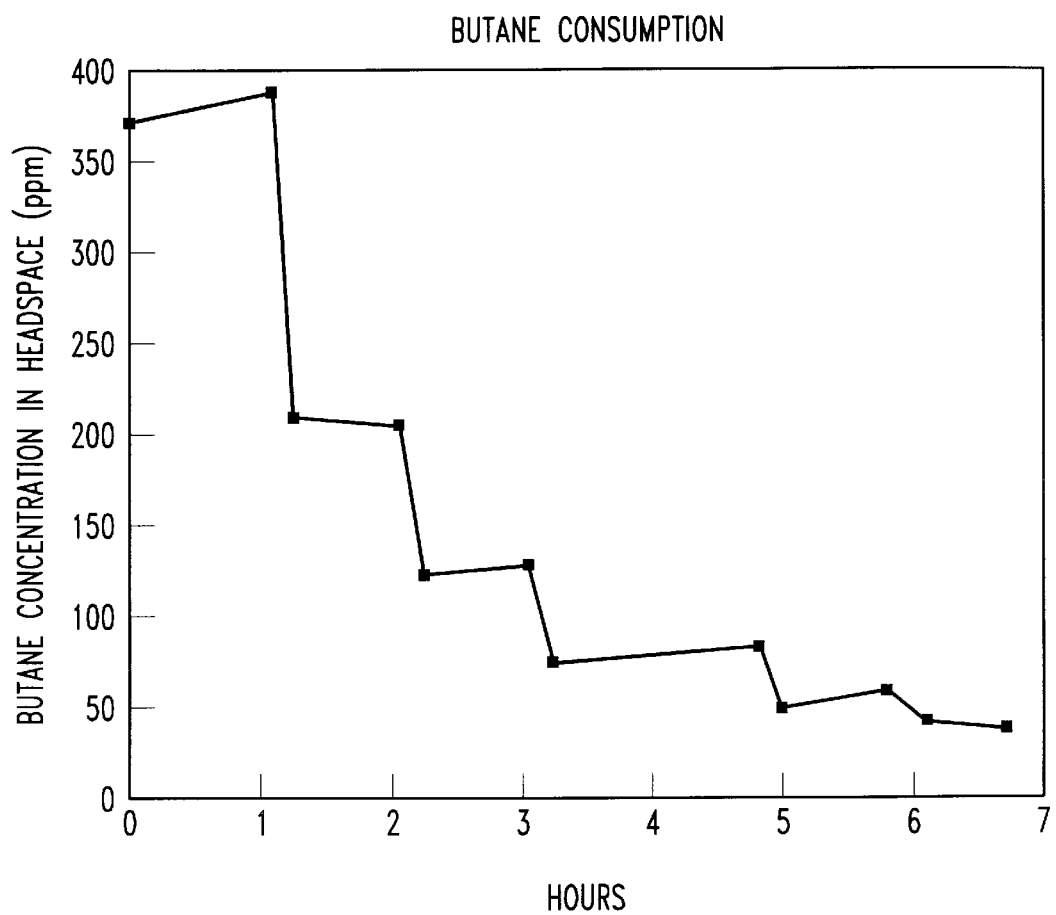
FIG. 21 is a graph showing butane consumption versus time during operation of a bioreactor in accordance with the present invention.
Figure 22:
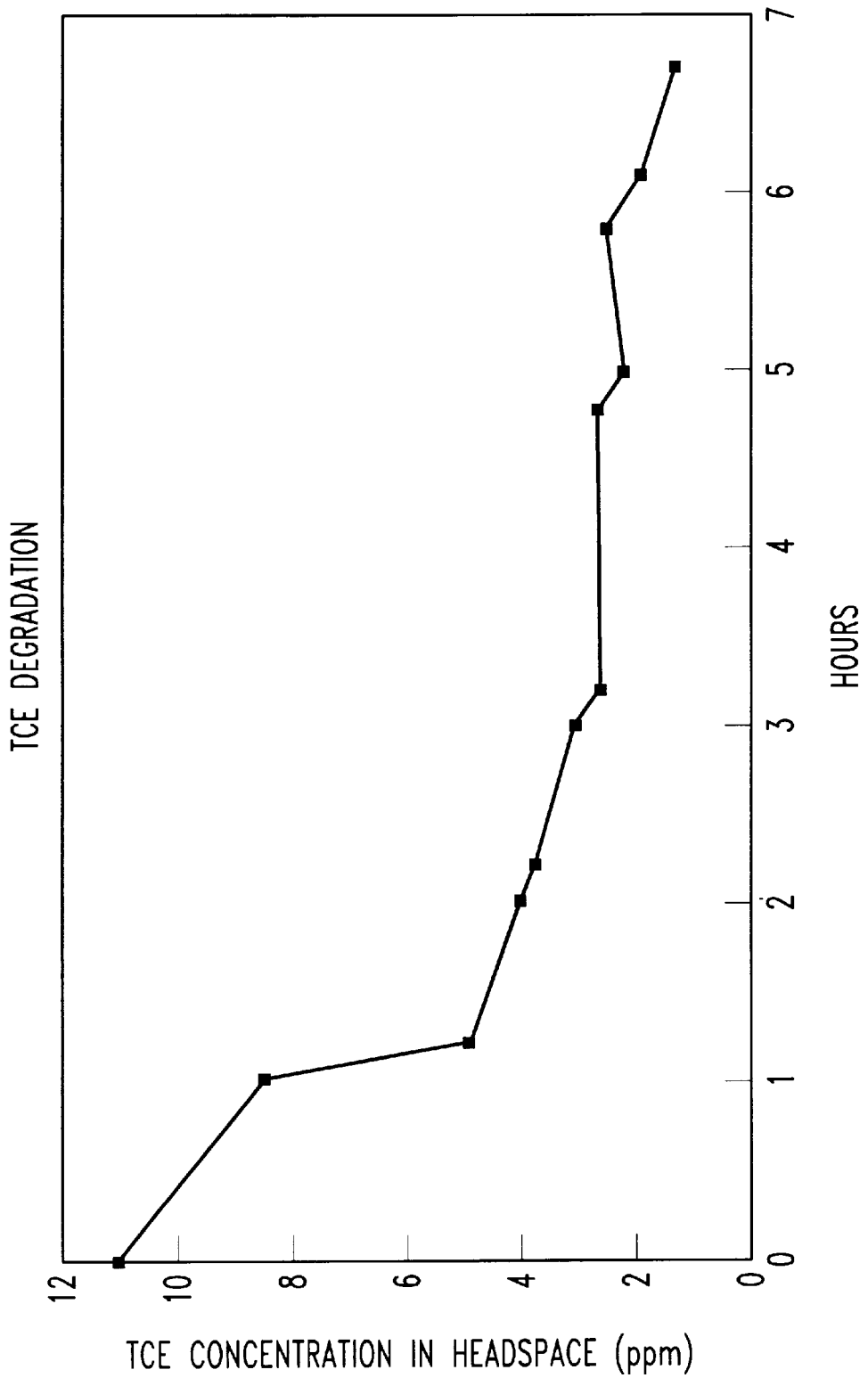
FIG. 22 is a graph showing TCE degradation versus time during operation of a bioreactor in accordance with the present invention.

FIGS. 21 and 22 demonstrate the degradation of TCE and butane in the dual-bioreactors while running in batch mode. TCE disappearance from an initial aqueous-phase concentration of 22 mg/liter (ppm), exceedingly higher than its toxic concentration to methanotrophs and propane oxidizers, was measured utilizing headspace analysis. TCE was degraded at a rate of about 2.7 mg/hr/liter for the first 3 hours of operation, and then at a rate of 0.5 mg/hr/liter for the final 3.7 hours of operation.

In addition to batch-type processes, the bioreactors of the present invention may also operate by continuous flow techniques. For example, process, scale-up and operation in continuous flow mode in three tandem bioreactors similar to those shown in FIG. 18 may provide a degradation rate of 120 mg of TCE per hour at a flow rate of 36 liters per hour. TCE removal (efficiency may be increased substantially by controlling process parameters such as increasing biofilm surface area with the medium, improving butane and oxygen delivery systems and adjusting adequate conditions for optimum bacterial growth. Various other support media, i.e., non-metallic screens, pellets, beads, etc., for the biofilm in the bioreactors listed above may provide a larger surface area for biofilm formation prior to the treatment phase. Other types of support media may also optimize bacterial growth and surface to volume ratio in the bioreactor thus improving biodegradation conditions, and effectively reducing the required residence times within the bioreactor. Greater performance may be achieved by utilizing effective oxygen and growth substrate delivery systems such as sparging. This can be accomplished by reducing bubble size during sparging which would increase the availability of the compounds to the microorganism inside the bioreactor. In certain cases, it may be desirable to reduce the negative effects of extremely stressed influent streams to the bioreactor by pre-adjusting pH, temperature and other related physico-chemical parameters.

Whereas particular embodiments of this invention have been described above for purposes of illustration, it will be evident to those skilled in the art that numerous variations of the details of the present invention may be made without departing from the invention as defined in the appended claims.

What is claimed is:

1. A bioreactor for degrading hydrocarbon pollutants comprising:

a fluid container;

a substrate disposed within the container supporting butane-utilizing bacteria;

means for introducing contaminated fluid from a source of contaminated fluid into the container, the contaminated fluid comprising at least one hydrocarbon pollutant;

a butane food source;

means for introducing butane from the butane food source into the container to stimulate the growth of the butane-utilizing bacteria;

means for introducing oxygen into the container; and means for removing treated fluid from the container having a substantially lower concentration of the at least one hydrocarbon pollutant than the contaminated fluid.

2. The bioreactor of claim 1, wherein the bioreactor comprises a single fluid container.

3. The bioreactor of claim 1, wherein the bioreactor comprises a plurality of fluid containers.

4. The bioreactor of claim 1, wherein the bioreactor is portable.

5. The bioreactor of claim 1, wherein the bioreactor comprises means for treating batches of the contaminated fluid.

6. The bioreactor of claim 1, wherein the bioreactor comprises means for continuously treating the contaminated fluid.

7. The bioreactor of claim 1, wherein the butane-utilizing bacteria comprises at least one bacterium selected from the group consisting of *putida, rubrisubalbicans, aeruginosa, paradoxus, asteroides, brasiliensis, restricta, globerula, indologenes, meningosepticum, acidovorans, delafieldii, rhodochrous, erythropolis, fascians, barkeri, esteroaromaticum, saperdae, varians, kristinae, caviae, maltophilia, thalpophilum, spiritivorun, putrefaciens* B, *myrsinacearum, michiganense, xylosoxydans, terrae, aquaticum* B and *johnsonae*.

8. The bioreactor of claim 1, wherein the contaminated fluid comprises water and the hydrocarbon pollutant comprises greater than about 10 mg/liter trichloroethene in aqueous solution.

9. The bioreactor of claim 1, wherein the contaminated fluid comprises water, the hydrocarbon pollutant comprises trichloroethene, and the bioreactor is capable of degrading the trichloroethene at a rate of greater than about 1 mg/hr/liter.

10. The bioreactor of claim 1, wherein the contaminated fluid comprises water, the hydrocarbon pollutant comprises trichloroethene, and the bioreactor is capable of degrading the trichloroethene at a rate of greater than about 1.5 mg/hr/liter.

11. The bioreactor of claim 1, wherein the contaminated fluid comprises water, the hydrocarbon pollutant comprises trichloroethene, and the bioreactor is capable of degrading the trichloroethene at a rate of greater than about 2 mg/hr/liter.

12. The bioreactor of claim 1, wherein the butane-utilizing bacteria comprises at least one bacterium selected from the group consisting of Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga.

13. The bioreactor of claim 1, further comprising means for pulsing the butane into the container.

14. A bioreactor for degrading trichloroethene comprising:

a fluid container;

a substrate disposed within the container supporting butane-utilizing bacteria;

a contaminated fluid source comprising greater than about 6 mg/liter trichloroethene;

means for introducing contaminated fluid from the contaminated fluid source into the container;

a butane food source;

means for introducing butane from the butane food source into the container to stimulate the growth of the butane-utilizing bacteria;

an oxygen source;

means for introducing oxygen from the oxygen source into the container; and means for removing decontaminated fluid from the container having a substantially lower concentration of the trichlorcethene than the contaminated fluid.

15. The bioreactor of claim 14, wherein the contaminated fluid comprises greater than about 10 mg/liter trichloroethere.

16. The bioreactor of claim 14, wherein the contaminated fluid comprises greater than about 20 mg/liter trichloroethene.

17. The bioreactor of claim 14, wherein the butane-utilizing bacteria comprises at least one bacterium selected from the group consisting of Pseudomonas, Variovorax, Nocardia, Chryseobacterium Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga.

18. The bioreactor of claim 14, further comprising means for pulsing the butane into the container.

* * * * *